US012038706B2

(12) United States Patent
Takei

(10) Patent No.: US 12,038,706 B2
(45) Date of Patent: Jul. 16, 2024

(54) FIXING APPARATUS

(71) Applicant: CANON KABUSHIKI KAISHA, Tokyo (JP)

(72) Inventor: Yuhei Takei, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/339,143

(22) Filed: Jun. 21, 2023

(65) Prior Publication Data

US 2023/0333503 A1 Oct. 19, 2023

Related U.S. Application Data

(63) Continuation of application No. 17/839,288, filed on Jun. 13, 2022, now Pat. No. 11,714,371.

(30) Foreign Application Priority Data

Jun. 17, 2021 (JP) ................................ 2021-100789

(51) Int. Cl.
*G03G 15/20* (2006.01)

(52) U.S. Cl.
CPC ..... *G03G 15/2053* (2013.01); *G03G 15/2064* (2013.01); *G03G 2215/2032* (2013.01); *G03G 2215/2041* (2013.01)

(58) Field of Classification Search
CPC ............................................ G03G 2215/00143
See application file for complete search history.

(56) References Cited

U.S. PATENT DOCUMENTS

| | | | | | |
|---|---|---|---|---|---|
| 5,887,236 | A * | 3/1999 | Hirao | G03G 15/2032 | 399/328 |
| 2009/0317108 | A1* | 12/2009 | Taki | G03G 15/1605 | 399/66 |
| 2015/0125189 | A1* | 5/2015 | Hozumi | B65H 5/025 | 474/123 |
| 2018/0257885 | A1* | 9/2018 | Nakajima | B65H 5/026 | |

* cited by examiner

*Primary Examiner* — Sevan A Aydin
(74) *Attorney, Agent, or Firm* — Canon U.S.A., Inc. IP Division

(57) ABSTRACT

A fixing apparatus includes a fixing belt, a steering roller, a pressure rotation member, and a contact-separation mechanism. The contact-separation mechanism moves the pressure rotation member to a position where the pressure rotation member is in a contact state with the fixing belt and a position where the pressure rotation member is in a separated state from the fixing belt. Swing of the steering roller is controlled so that the fixing belt moves to a predetermined position in a fixing belt width direction. A distance between a center position of the fixing belt in tilting the steering roller for a first time after the center position is separated from a center position of a range of movement of the fixing belt and the center position of the range of movement of the fixing belt in the width direction is smaller in the separated state than in the contact state.

8 Claims, 17 Drawing Sheets

| FIRST SENSOR 394 | SECOND SENSOR 395 | THIRD SENSOR 396 | BELT POSITION |
|---|---|---|---|
| 0 | 0 | 0 | FIRST FULL DEVIATION |
| 1 | 0 | 0 | NEAR 3 |
| 1 | 1 | 0 | NEAR 2 |
| 0 | 1 | 0 | NEAR 1 |
| 0 | 1 | 1 | CENTER |
| 1 | 1 | 1 | FAR 1 |
| 1 | 0 | 1 | FAR 2 |
| 0 | 0 | 1 | FAR 3 |
| 0 | 0 | 0 | SECOND FULL DEVIATION |

SENSOR BLOCKED: 0 SENSOR OPEN: 1

FIG.17

| BELT POSITION | ASSIGNED VALUE |
|---|---|
| FIRST FULL DEVIATION | — |
| NEAR 3 | 1 |
| NEAR 2 | 2 |
| NEAR 1 | 3 |
| CENTER | 4 |
| FAR 1 | 5 |
| FAR 2 | 6 |
| FAR 3 | 7 |
| SECOND FULL DEVIATION | — |

FIXING APPARATUS

CROSS-REFERENCE TO RELATED APPLICATIONS

The present application is a continuation of U.S. patent application Ser. No. 17/839,288, filed on Jun. 13, 2022, which claims priority from Japanese Patent Application No. 2021-100789 filed Jun. 17, 2021, which are hereby incorporated by reference herein in their entireties.

BACKGROUND

Field

The present disclosure relates to a fixing apparatus for fixing a toner image on a recording material to the recording material.

Description of the Related Art

An image forming apparatus includes a fixing apparatus for fixing an unfixed toner image on a recording material to the recording material.

The fixing apparatus includes a rotation member pair including a fixing belt and a pressure rotation member. The fixing belt applies heat to the unfixed toner image and is driven to rotate. The pressure rotation member presses the fixing belt to form a nip portion with the fixing belt and is driven to rotate. If a recording material bearing an unfixed toner image is conveyed to the nip portion, the heat from the fixing belt and the pressure from the pressure rotation member are applied to the recording material, whereby the unfixed toner image is fixed to the recording material.

The fixing apparatus also includes a contact-separation mechanism that can move the pressure rotation member to a position where the pressure rotation member makes contact with the fixing belt and a position where the pressure rotation member is separated from the fixing belt.

Japanese Patent Application Laid-Open No. 2015-59964 discusses steering control to reciprocate a fixing belt in a width direction. Reciprocating the fixing belt within a predetermined area repeatedly can prevent the fixing belt from running off a steering roller. Moreover, edges of recording materials are prevented from passing over the same area of the fixing belt constantly. Deterioration to the surface of the fixing belt can thus be reduced.

During image formation, the pressure rotation member presses a fixing pad via the fixing belt with a force of 170 kilogram-force (kgf), whereby a pressure suitable for fixing is applied to the recording material.

In a state where no recording material is passed through the fixing nip portion for several seconds, the pressure rotation member is separated from the fixing belt to prevent an increase in the temperature of the pressure rotation member (separated state). In the separated state, if the fixing belt is reciprocated in the width direction by the steering control, the reciprocation speed of the fixing belt increases by twice or three times compared to that in a contact state.

Conventionally, the steering control condition in the contact state has been applied in the separated state as well.

As a result, appropriate steering control has not been performed in the separated state.

Therefore, there has been a possibility of a full deviation error because the steering control in the separated state is too late.

SUMMARY

The present disclosure is directed to performing appropriate steering control to reciprocate a fixing belt of a fixing apparatus in a width direction. For example, under the steering control when a pressure rotation member is in a separated state, the fixing belt is reciprocated in a narrower range than that under the steering control when the pressure rotation member is in a contact state.

According to an aspect of the present disclosure, a fixing apparatus includes: a fixing belt that is rotatable and endless, a heating roller configured to make contact with an inner peripheral surface of the fixing belt and apply heat to the fixing belt, a steering roller configured to make contact with the inner peripheral surface of the fixing belt along with the heating roller, a pressure rotation member configured to press the fixing belt, wherein the pressure rotation member and the fixing belt form a nip portion and, to fix an unfixed toner image to a recording material, the recording material bearing the unfixed toner image is conveyed to the nip portion and sandwiched between the pressure rotation member and the fixing belt, a contact-separation mechanism configured to move the pressure rotation member to a position where the pressure rotation member is in a contact state with the fixing belt and to a position where the pressure rotation member is in a separated state from the fixing belt, a belt position detection unit configured to detect a position of the fixing belt in a width direction of the fixing belt, and a control unit configured to control swing of the steering roller based on a detection result of the belt position detection unit so that the fixing belt moves to a predetermined position in the width direction, wherein a distance between a center position of the fixing belt in performing an operation to tilt the steering roller for a first time after the center position of the fixing belt is separated from a center position of a range of movement of the fixing belt and the center position of the range of movement of the fixing belt in the width direction is smaller in the separated state than in the contact state.

Further features of the present disclosure will become apparent from the following description of exemplary embodiments with reference to the attached drawings.

BRIEF DESCRIPTION OF THE DRAWINGS

FIG. 17 is a table illustrating a relationship between belt positions and assigned values according to the modification.

DESCRIPTION OF THE EMBODIMENTS

<Image Forming Apparatus>

Figure 1:
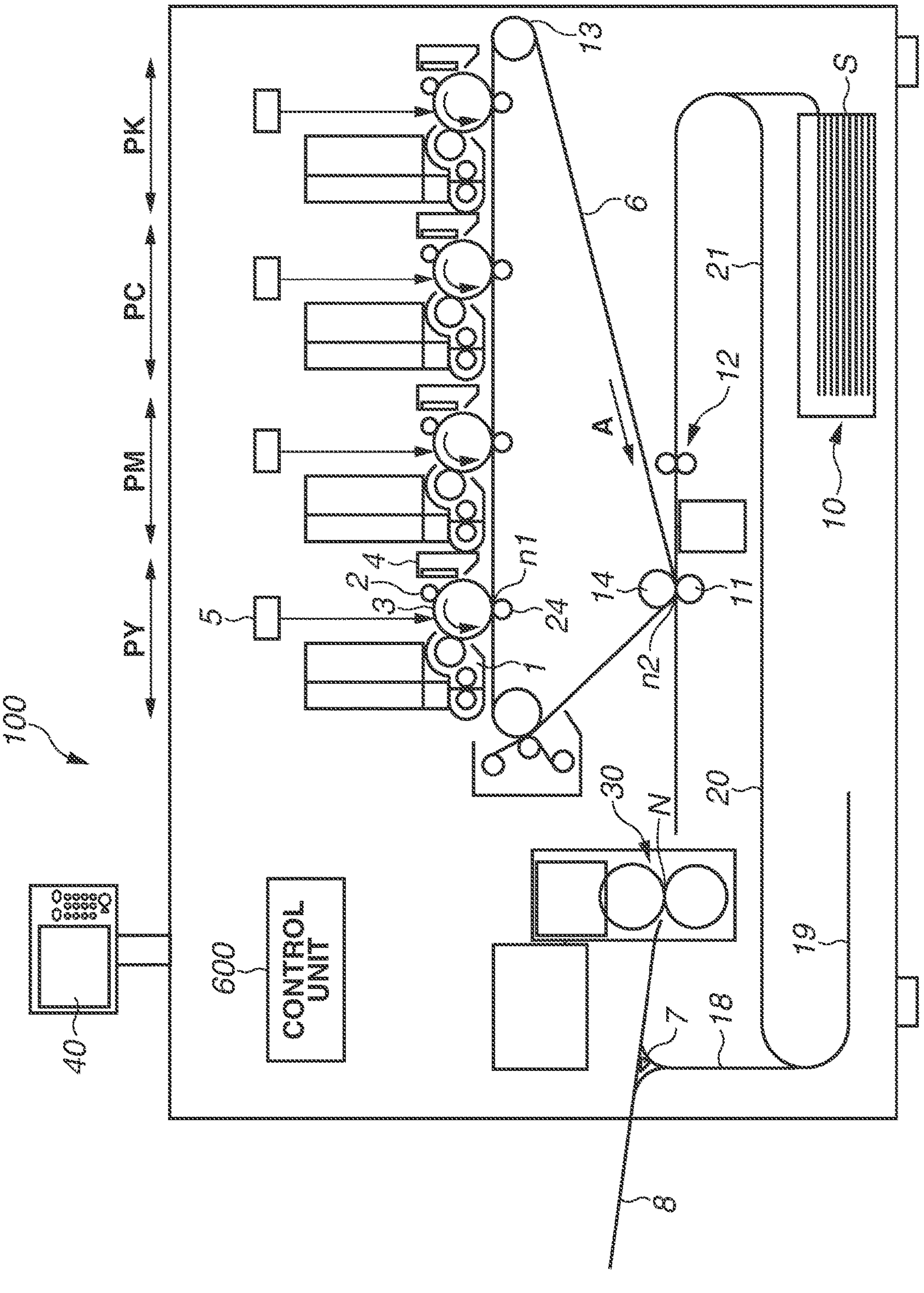
FIG. 1 is a schematic diagram illustrating a configuration of an image forming apparatus.

FIG. 1 is a schematic diagram illustrating a configuration of an image forming apparatus 100. As illustrated in FIG. 1, the image forming apparatus 100 includes four types of image forming units PY, PM, PC, and PK for yellow, magenta, cyan, and black, respectively, arranged in a moving direction of an intermediate transfer belt 6. First, the process of forming a toner image on the intermediate transfer belt 6 will be described by using the yellow image forming unit PY as an example.

The surface of a photosensitive drum 3 driven to rotate is uniformly charged by a charging device 2 (charging). An exposure device 5 then irradiates the surface of the photosensitive drum 3 with a laser beam based on input image data, whereby an electrostatic latent image is formed on the surface of the photosensitive drum 3 (exposure). A developing device 1 then forms a yellow toner image on the photosensitive drum 3 (development). A primary transfer roller 24 applies a voltage of opposite polarity to that of the potential of the yellow toner image to the intermediate transfer belt 6. The yellow toner image on the photosensitive drum 3 is thereby transferred to the intermediate transfer belt 6 (primary transfer). Yellow toner left untransferred on the surface of the photosensitive drum 3 is scraped off by a toner cleaner 4 and removed from the surface of the photosensitive drum 3. Such a series of processes is similarly performed in the magenta, cyan, and black image forming units PM, PC, and PK. As a result, a full-color toner image is formed on the intermediate transfer belt 6.

The toner image on the intermediate transfer belt 6 is conveyed to a secondary transfer portion n2 formed by a secondary transfer roller pair 11 and 14. Recording materials S are taken out from a recording material cassette 10 one by one, and fed to the secondary transfer portion n2 in synchronization with the conveyance timing of toner images. The toner image on the intermediate transfer belt 6 is transferred to a fed recording material S (secondary transfer). Specific examples of the recording material S include plain paper, a resin sheet, coated paper, thick paper, and an overhead projector sheet.

The recording material S to which the toner image is transferred is conveyed to a fixing apparatus 30. The toner image is fixed to the recording material S by heat and pressure in the fixing apparatus 30 (fixing). The recording material S to which the toner image is fixed is discharged to a discharge tray 8.

The image forming apparatus 100 can also form a monochrome image. In forming a monochrome image, only the black image forming unit PK among the plurality of image forming units is driven.

Two-sided printing for forming images on both sides of a recording material S will be described. A recording material S having an image formed on one side is discharged from the fixing apparatus 30 and then guided to a sheet path 18 by a flapper 7. The recording material S is conveyed from the sheet path 18 to a reversing path 19, and switched back on the reversing path 19. The recording material S is then passed through a two-sided path 20 and conveyed to a sheet path 21. The recording material S here is in a reversed state. The recording material S is then conveyed to the secondary transfer portion n2 again, and a toner image is transferred thereto. The toner image is fixed by the fixing apparatus 30. Then, the two-sided-printed recording material S is discharged to the discharge tray 8.

The series of processes from the charging to the discharge of the toner image-fixed recording material S to the discharge tray 8 will be referred to as image formation processing (print job). The period during which image formation is performed will be referred to as an image formation processing period (print job period).

<Fixing Apparatus>

Figure 2:
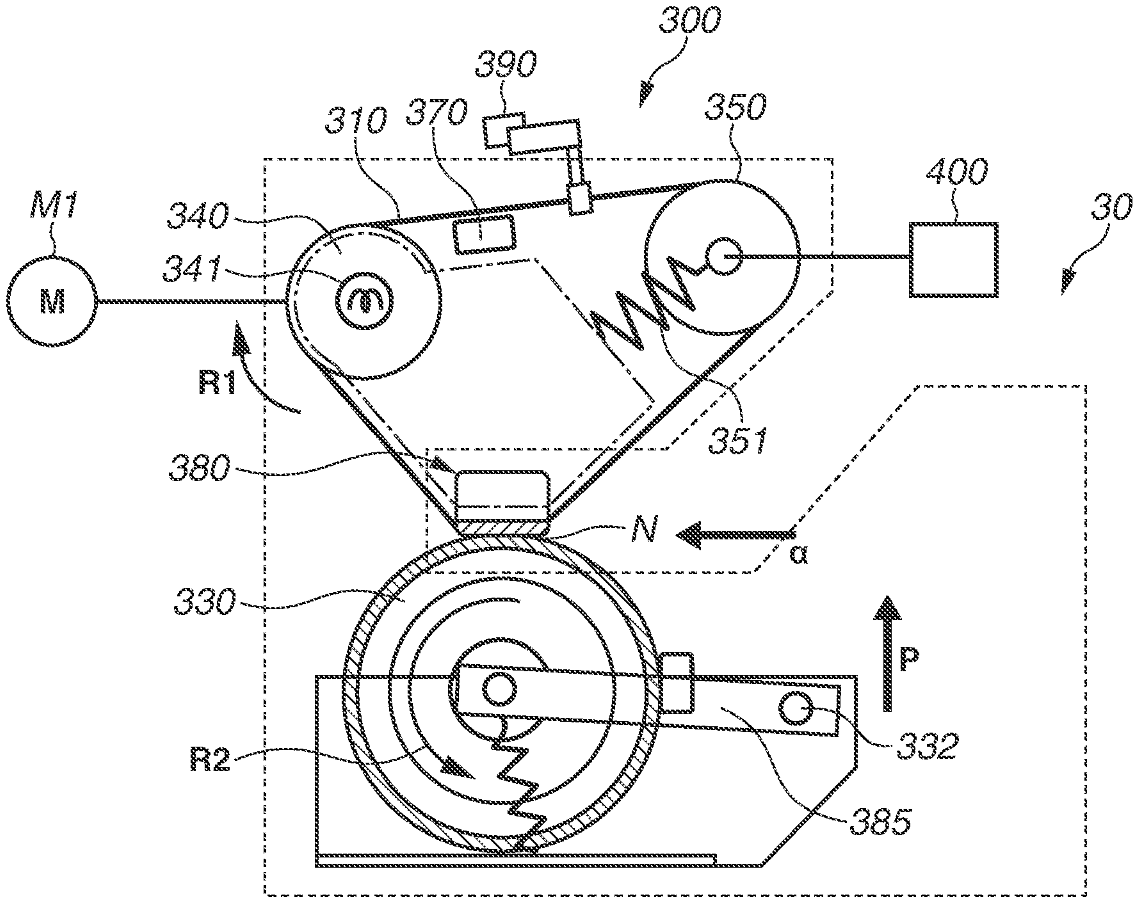
FIG. 2 is a schematic sectional view of a fixing apparatus.

Next, the fixing apparatus 30 according to the present exemplary embodiment will be described with reference to FIG. 2.

In the present exemplary embodiment, a fixing apparatus using an endless fixing belt 310 is employed. In FIG. 2, a recording material is conveyed in a direction indicated by an arrow a. The fixing apparatus 30 includes a heating rotation member 300 and a pressure rotation member 330. The heating rotation member 300 includes the fixing belt 310. The pressure rotation member 330 forms a nip portion N with the fixing belt 310 by making contact with the fixing belt 310 and applying pressure thereto.

The pressure rotation member 330 includes the fixing belt 310, a steering roller 350, a fixing pad 380 that is a pad member, and a heating roller 340. The steering roller 350, the fixing pad 380, and the heating roller 340 are in contact with the inner peripheral surface of the fixing belt 310. The fixing belt 310 is stretched around the steering roller 350, the fixing pad 380, and the heating roller 340.

The heating roller 340 is cylindrically formed of a metal such as aluminum and stainless steel. In the present exemplary embodiment, the heating roller 340 is made of an aluminum pipe having an outer diameter of 80 mm. A halogen heater 341 serving as a heating unit for heating the fixing belt 310 is disposed inside the heating roller 340. The halogen heater 341 heats the heating roller 340 to a predetermined temperature. The heating roller 340 heated by the heat from the halogen heater 341 heats the fixing belt 310. The fixing belt 310 is controlled to a predetermined target temperature corresponding to a grammage of the recording material to be fixed based on a temperature detection result of a fixing temperature detection sensor (not illustrated).

The heating unit is not limited to a halogen heater. For example, the heating unit may be configured to cause the heating roller 340 to generate heat by induction heating (IH). The heating roller 340 is driven to rotate in a direction of an arrow R1 by a drive motor M1.

The fixing belt 310 has excellent heat conductivity and heat resistance. The fixing belt 310 is shaped as a thin endless belt having an inner diameter of 120 mm, for example. In the present exemplary embodiment, the fixing belt 310 has a three-layer structure including a stack of a base layer, an elastic layer outside the base layer, and a releasing layer outside the elastic layer. The base layer is made of a polyimide resin and has a thickness of 60 μm. The elastic layer is made of silicone rubber and has a thickness of 300 μm. The releasing layer is made of a fluorocarbon resin tetrafluoroethylene perfluoroalkoxy alkanes (PFA) and has a thickness of 30 μm. The pressure rotation member 330 to be described below is brought into contact with the fixing belt 310 and driven to rotate, whereby the fixing belt 310 is driven to rotate. Since the heating roller 340 is driven to rotate by the drive of the drive motor M1, the fixing belt 310 can be said to be also driven to rotate by the rotational drive of the heating roller 340.

The fixing pad 380 is disposed in contact with the inner peripheral surface of the fixing belt 310 and opposed to the pressure rotation member 330 with the fixing belt 310 therebetween.

The pressure rotation member 330 includes a cylindrical aluminum core, a 1-mm-thick elastic layer outside the core, and a releasing layer outside the elastic layer. The releasing layer is intended to improve toner releasability.

The pressure rotation member 330 can be moved by a contact-separation mechanism capable of moving the pressure rotation member 330 into contact with and away from the fixing belt 310. The contact-separation mechanism includes a frame 385 and a not-illustrated drive motor. The frame 385 is supported by a main body of the image forming apparatus 100. The frame 385 supports the pressure rotation member 330. The frame 385 is driven to rotate by the not-illustrated drive motor with a rotation shaft 332 as a rotation axis. As the frame 385 is rotated by the not-illustrated drive motor with the rotation shaft 332 as the rotation axis, the pressure rotation member 330 moves in a direction of an arrow P. The pressure rotation member 330 is thereby brought into contact with the fixing pad 380 with the fixing belt 310 therebetween (contact state) in a direction perpendicular to the conveyance direction a of the recording material. This forms the nip portion N. In the present exemplary embodiment, the fixing belt 310 is pressed with a total pressing force of 2000 N, where the nip portion N has a width of 24 mm. If the frame 385 is rotated in a direction opposite to the contacting direction with the rotation shaft 332 as the rotation axis, the pressure rotation member 330 is separated from the fixing belt 310 (separated state).

The pressure rotation member 330 is driven to rotate in a direction of an arrow R2. The fixing belt 310 sandwiched between the pressure rotation member 330 and the fixing pad 380 is thus driven to rotate by the rotational drive of the pressure rotation member 330.

As described above, a recording material bearing an unfixed toner image is nipped at and conveyed through the nip portion N, applied with heat and pressure by the heating rotation member 300 and the pressure rotation member 330, and the unfixed toner image is fixed to the recording material by the heat and pressure.

<Steering Roller>

Next, the steering roller 350 according to the present exemplary embodiment will be described with reference to FIGS. 2 and 3.

In the contact state according to the present exemplary embodiment, a force of 2000 N is applied to the fixing belt 310. The surface of the fixing belt 310 can thus be damaged by edges of recording materials, causing uneven gloss. A detailed description thereof will now be provided.

<Uneven Gloss Due to Paper Edge Scratches>

Paper edge scratches refer to scratches on the surface of the fixing belt 310 due to cut sections (edges) of recording materials. In fixing an unfixed toner image to a recording material, portions of the fixing belt 310 in contact with the edges (edge contact portions) undergo higher stress than portions not in contact with the edges (edge non-contact portions). Areas damaged by the edges of recording materials can be recessed compared to the edge non-contact portions. Such recesses in the surface of the fixing belt 310 due to the edges of recording materials are referred to as the paper edge scratches.

In fixing an unfixed toner image to a recording material, the fixing apparatus 30 applies pressure and heat to the recording material.

The surface state of the fixing belt 310 here is reflected on the gloss on the surface of the fixed image. If the surface of the fixing belt 310 is uneven, the unevenness is reflected on the gloss on the image surface. As a result, uneven gloss occurs on the image surface.

If an unfixed toner image is fixed to a recording material with paper edge scratches on the surface of the fixing belt 310, uneven gloss as if straight lines are drawn can occur on the image surface.

In the present exemplary embodiment, steering control using a steering mechanism 400 for reciprocating the fixing belt 310 in a width direction is used to reduce occurrence of paper edge scratches on the surface of the fixing belt 310.

The steering control will be described with reference to FIG. 3.

Figure 3:
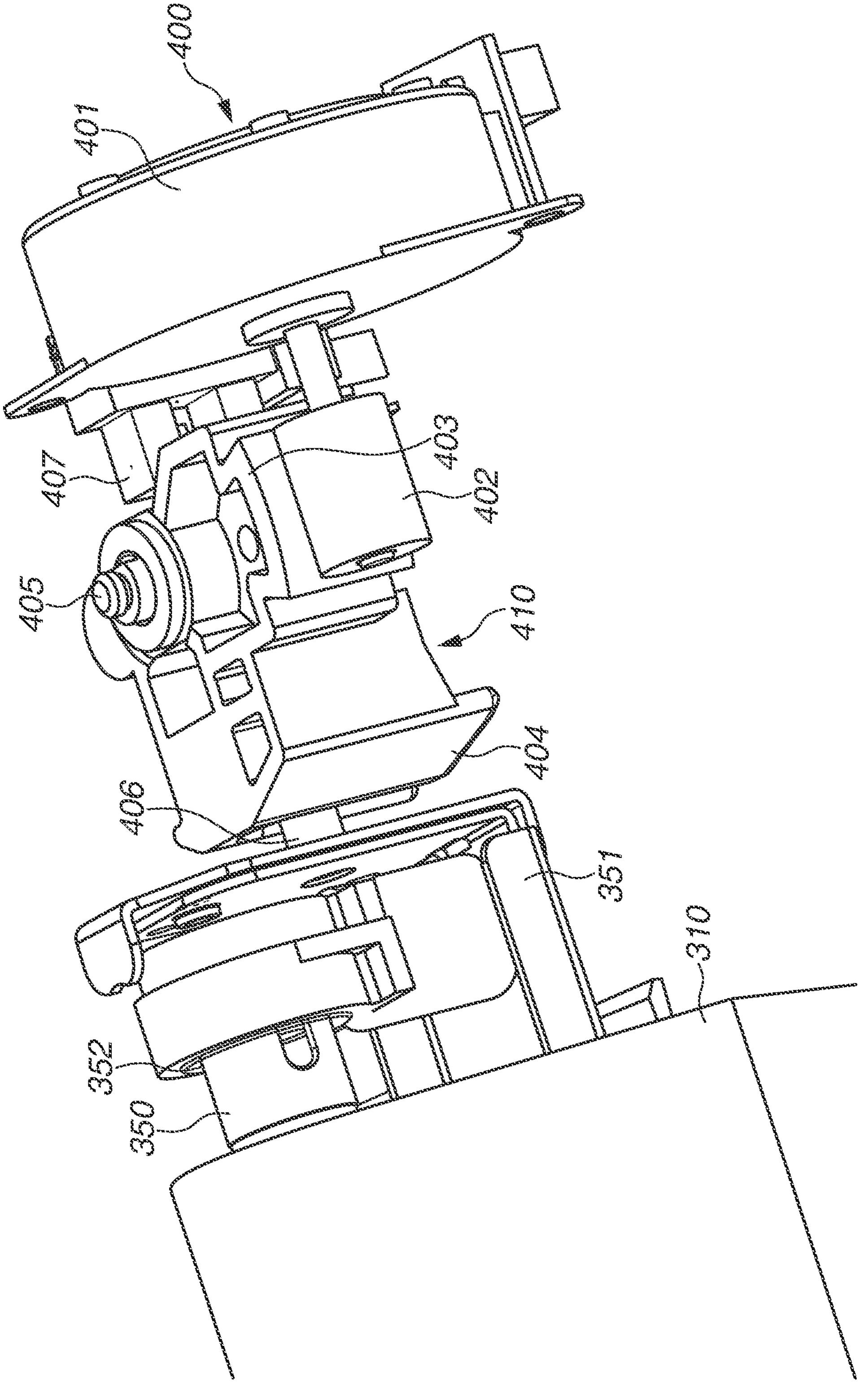
FIG. 3 is a schematic diagram illustrating a steering mechanism.

As illustrated in FIG. 3, the steering mechanism 400 includes the steering roller 350, a steering motor 401, a worm 402, a worm wheel 403, and a fork plate 404. The steering motor 401 can rotate in a forward direction and a reverse direction. As the steering motor 401 is driven to rotate by a signal from a control unit 600, the worm 402 attached to the steering motor 401 rotates.

A drive conversion unit 410 having the worm wheel 403 and the fork plate 404 integrally formed thereon converts the rotation of the worm 402 into a swing in a rotation axis direction of the steering motor 401 with a rotation shaft portion 405 as the swing center. More specifically, the worm wheel 403 meshes with the worm 402, and is disposed to be capable of reciprocating in the rotation axis direction of the steering motor 401 with the rotation of the worm 402. For that purpose, the worm wheel 403 is formed to have an arcuate meshing surface so that the meshing surface meshes with the worm 402 at the center in the rotation axis direction. The drive conversion unit 410 can thus be swung with the rotation shaft portion 405 as the swing center via the worm 402 and the worm wheel 403 with the rotation of the steering motor 401.

The steering mechanism 400 also includes a steering operation shaft 406, a steering roller support arm 351, and a bearing unit 352. The steering operation shaft 406, the steering roller support arm 351, and the bearing unit 352 are integrally formed with each other and attached to the steering roller 350. The bearing unit 352 rotatably supports a rotation shaft of the steering roller 350. The steering roller support arm 351 is rotatably disposed, and rotatably supports the steering roller 350 by holding the bearing unit 352.

The steering operation shaft 406 to be fitted to the foregoing drive conversion unit 410 is fixed to the steering roller support arm 351. The steering operation shaft 406 is fitted to the fork plate 404 of the drive conversion unit 410, and can move with the drive conversion unit 410 while being maintained fitted to the drive conversion unit 410. The tilt of the steering roller 350 thus changes in a manner linked with the swing of the drive conversion unit 410. More specifically, the angle at which the steering roller 350 is disposed with respect to the heating roller 340 (see FIG. 2) can be continuously changed by driving the steering motor 401. If the steering angle of the steering roller 350 is thus adjusted, the fixing belt 310 stretched around the steering roller 350, the heating roller 340, and the fixing pad 380 reciprocates in the width direction. This can implement the steering control on the fixing belt 310 so that the fixing belt 310 reciprocates within a predetermined area in the width direction. The fixing belt 310 is moved to reciprocate in opposite moving directions if the steering roller 350 is tilted by rotating the steering motor 401 forward and if the steering roller 350 is tilted by rotating the steering motor 401 backward.

As described above, the steering mechanism 400 moves the fixing belt 310 to reciprocate in the width direction within the area of the steering roller 350. The reciprocation of the fixing belt 310 prevents the edges of recording materials from passing over the same area of the surface of the fixing belt 310 constantly. This can reduce the occurrence of paper edge scratches on the surface of the fixing belt 310.

<Fixing Belt Position Detection>

A belt position detection unit for detecting the position of the fixing belt 310 in the width direction will be described with reference to FIGS. 2, 3, and 4.

In the present exemplary embodiment, the fixing apparatus 30 includes a sensor unit 390 for detecting the position of an end (hereinafter, may be referred to as an end position) of the fixing belt 310 in the width direction. The position of the end of the fixing belt 310 is detected based on output signals of the sensor unit 390. The tilt angle of the steering roller 350 is changed by operating the foregoing steering mechanism 400 based on the detected end position of the fixing belt 310. The configuration of the sensor unit 390 will be described with reference to FIG. 4.

Figure 4:
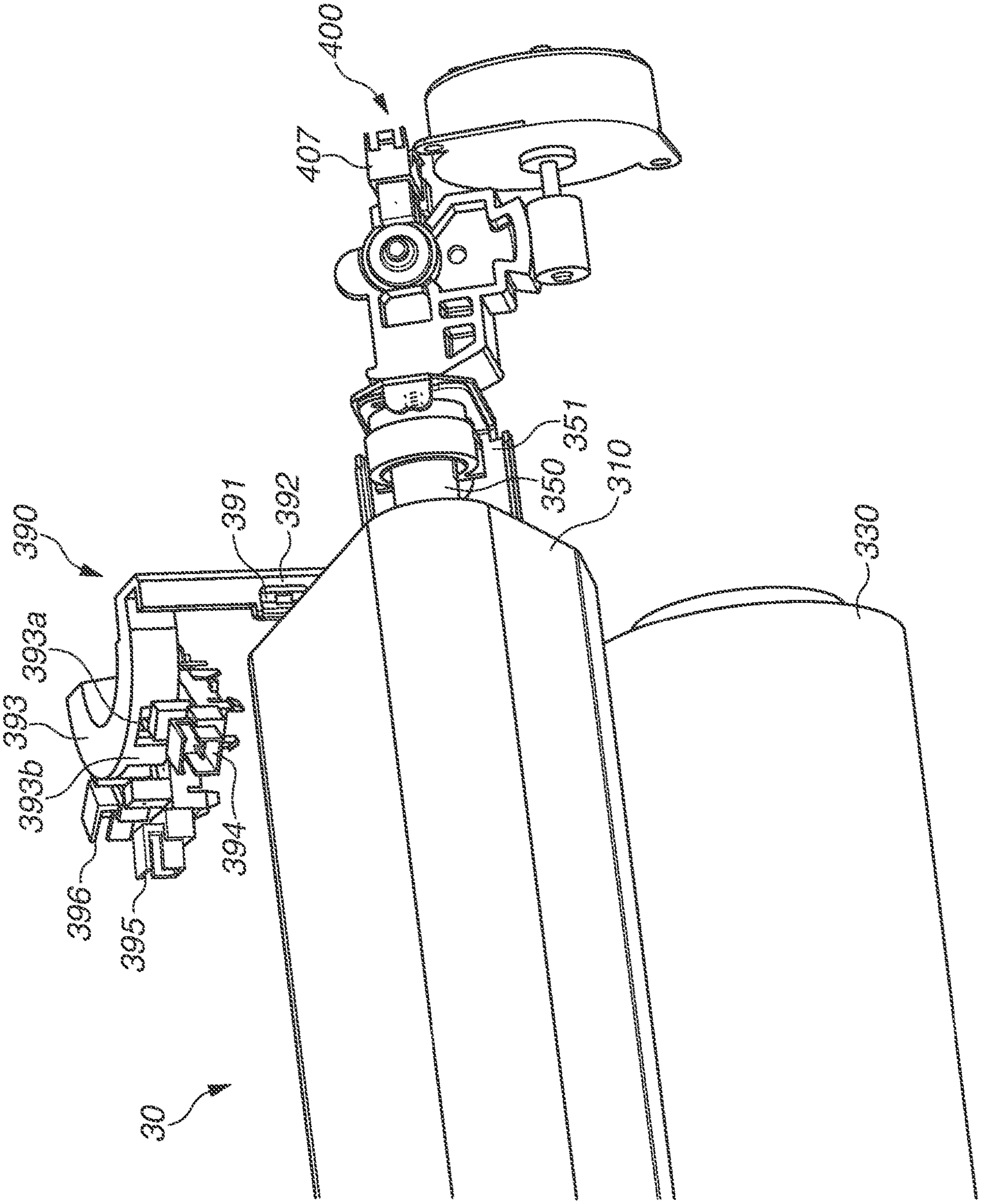
FIG. 4 is a schematic diagram illustrating a sensor unit for detecting the position of a fixing belt.

As illustrated in FIG. 4, the sensor unit 390 according to the present exemplary embodiment includes a contact member 391, an arm member 392, a belt position detection unit (hereinafter, may be referred to as a sensor flag) 393, and three sensors 394, 395, and 396. The contact member 391 makes contact with the end of the fixing belt 310. The arm member 392 is intended to support the contact member 391. The belt position detection unit 393 serves as a moving member. The sensors 394, 395, and 396 are intended to detect the position of the end of the fixing belt 310. For example, optical sensors are used as the sensors 394, 395, and 396. The contact member 391 is located on one end side of the arm member 392 to make contact with the end of the fixing belt 310 in the width direction.

The arm member 392 is biased from the end of the fixing belt 310 toward the center of the same in the width direction by a coil spring (not illustrated). The arm member 392 is rotatably disposed to follow the movement of the fixing belt 310 in the width direction via the contact member 391. The belt position detection unit 393 serving as the moving member is located on the other end of the arm member 392. For example, the belt position detection unit 393 is a fan-shaped columnar member and has a plurality of openings 393*a* and a plurality of to-be-detected portions 393*b* in/on its arcuate outer periphery. The three sensors 394, 395, and 396 are arranged at predetermined distances in a rotational movement direction of the belt position detection unit 393 so that the sensors 394, 395, and 396 are opposed to the outer periphery of the belt position detection unit 393 where the openings 393*a* and the to-be-detected portions 393*b* are formed.

In the present exemplary embodiment, when the fixing belt 310 moves from one end side to the other end side in the width direction, the belt position detection unit 393 rotates with the movement of the fixing belt 310. As the belt position detection unit 393 rotates, a positional relationship between the sensors 394, 395, and 396 and the to-be-detected portions 393*b* (or openings 393*a*) changes. Specifically, a detection state where the sensors 394, 395, and 396 detect the to-be-detected portions 393*b* and a non-detection state where the sensors 394, 395, and 396 are opposed to the openings 393*a* and thus do not detect any of the to-be-detected portions 393*b* are switched.

In the present exemplary embodiment, optical sensors are used as the sensors 394, 395, and 396. The sensors 394, 395, and 396 each include a light emission unit for emitting light and a light reception unit for receiving the light emitted from the light emission unit. The sensors 394, 395, and 396 emit a predetermined amount of light from the respective light emission units toward the belt position detection unit 393. If the emitted light is blocked by the to-be-detected portions 393*b* of the belt position detection unit 393, the light reception units of the sensors 394, 395, and 396 do not receive the light emitted from the light emission units. On the other hand, if the emitted light is not blocked by the to-be-detected portions 393*b* but passed through the openings 393*a* of the belt position detection unit 393, the light reception units receive the light emitted from the respective light emission units. In such a manner, whether the respective sensors 394, 395, and 396 receive light depends on the movement of the belt position detection unit 393.

<Control Unit>

Figure 5:
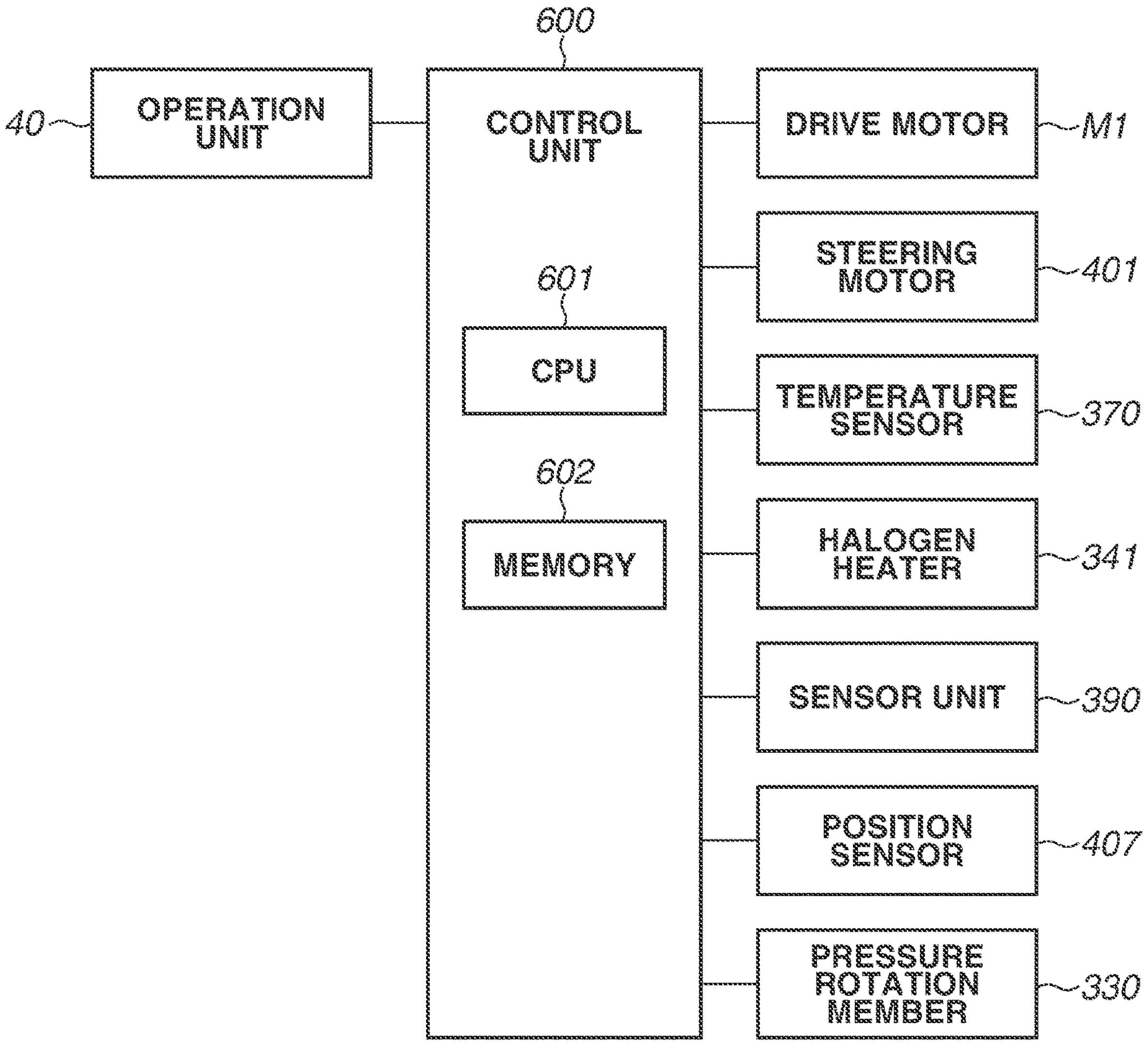
FIG. 5 is a block diagram for describing a control unit.

As illustrated in FIG. 1, the image forming apparatus 100 includes the control unit 600. The control unit 600 will be described with reference to FIG. 5 as well as FIGS. 2 to 4. The control unit 600 is also connected with various devices other than the illustrated ones, such as motors and power supplies for operating the image forming apparatus 100. Since such devices are irrelevant to the gist of the present exemplary embodiment, a depiction and description thereof will be omitted.

The control unit 600 serving as a control means performs various types of control such as an image forming operation. The control unit 600 includes a central processing unit (CPU) 601 and a memory 602, for example. The memory 602 includes a read-only memory (ROM) and a random access memory (RAM). The memory 602 stores various programs and various types of data for controlling the image forming apparatus 100. The CPU 601 can execute various programs stored in the memory 602, and can operate the image forming apparatus 100 by executing the various programs.

In the present exemplary embodiment, the CPU 601 executes an image formation job processing program and a steering control program to be described below, stored in the memory 602.

The memory 602 stores a sensor value table (see FIG. 6B to be described below) to be referred to in identifying the end position of the fixing belt 310 reciprocated by the steering control and in determining the presence or absence of a failure of the sensor unit 390 during belt deviation control processing, for example. The memory 602 can also temporarily store the results of calculation processing due to execution of various programs.

An operation unit 40 is connected to the control unit 600 via an input/output interface. For example, the operation unit 40 includes a touch-panel liquid crystal screen (display unit) so that the user can input start instructions for various programs such as the image formation job processing program, and various types of data such as the size of a recording material (A3, B4, etc.). The liquid crystal screen can display various screens including software keys. Various functions, such as giving start instructions for previously assigned various programs, can be performed based on the user's touch operations on the software keys. The liquid crystal screen can also display various types of information such as an operation status of the image forming apparatus 100 and error information for user notification. In other words, in the present exemplary embodiment, the operation unit 40 can function as a notification unit. The method for notifying the user of various types of information such as error information is not limited to the foregoing display-based one, and any appropriate notification method may be used. Examples include a sound-based notification method using a sound producing unit such as a speaker.

The drive motor M1, the steering motor 401, a temperature sensor 370, the halogen heater 341, the sensor unit 390, a position sensor 407, and a motor for driving the pressure rotation member 330 are further connected to the control unit 600 via input/output interfaces. If an instruction to start an image formation job is given from the operation unit 40, the control unit 600 (more specifically, the CPU 601) executes the image formation job processing program stored in the memory 602. The control unit 600 controls the image forming apparatus 100 based on the execution of the image formation job processing program. The control unit 600 thus drives the drive motor M1 to rotate the heating roller 340 and thereby rotate the fixing belt 310. The control unit 600 also controls the halogen heater 341 based on the detection result of the temperature sensor 370 so that the surface temperature of the fixing belt 310 becomes a desired target temperature (in the present exemplary embodiment, 180° C.). The control unit 600 also controls the motor that drives the pressure rotation member 330, and can thus determine whether the pressure rotation member 330 is in contact with or separated from the fixing belt 310.

In the present exemplary embodiment, the control unit 600 controls the steering motor 401 based on the detection result of the sensor unit 390, or more specifically, the combination of the output signals of the three sensors 394, 395, and 396 (see FIG. 6B to be described below). More specifically, the control unit 600 detects the end position of the fixing belt 310 based on the detection result of the sensor unit 390, and rotates the steering motor 401 forward or backward based on the amount of rotation determined from the detected position. The control unit 600 can thus perform the steering control on the fixing belt 310 by operating the foregoing steering mechanism 400 using the steering motor 401.

<Belt Position Detection Unit>

The belt position detection unit 393 mentioned above will be described with reference to FIGS. 6A and 6B. FIG. 6A is a top view for describing the belt position detection unit 393. FIG. 6B illustrates possible combinations of the output signals of the sensors 394, 395, and 396 in using the belt position detection unit 393. FIG. 6A illustrates 27 areas configured to be used in detecting nine positions of the fixing belt 310 in the width direction using the three sensors 394, 395, and 396. For example, the sensors 394, 395, and 396 each output an output signal "0" when in the detection state where any one of to-be-detected portions 393*b*1 to 393*b*5 is detected. In other words, each sensor outputs the output signal "0" when in a blocked state where the sensor is blocked by any one of the to-be-detected portions 393*b*1 to 393*b*5. On the other hand, the sensors 394, 395, and 396 each output an output signal "1" when in the non-detection state where none of the to-be-detected portions 393*b*1 to 393*b*5 is detected. In other words, each sensor outputs the output signal "1" when in an open state (also referred to as an unblocked state) where the sensor is opposed to one of openings 393*a*1 to 393*a*4.

Figures 6A, 6B:
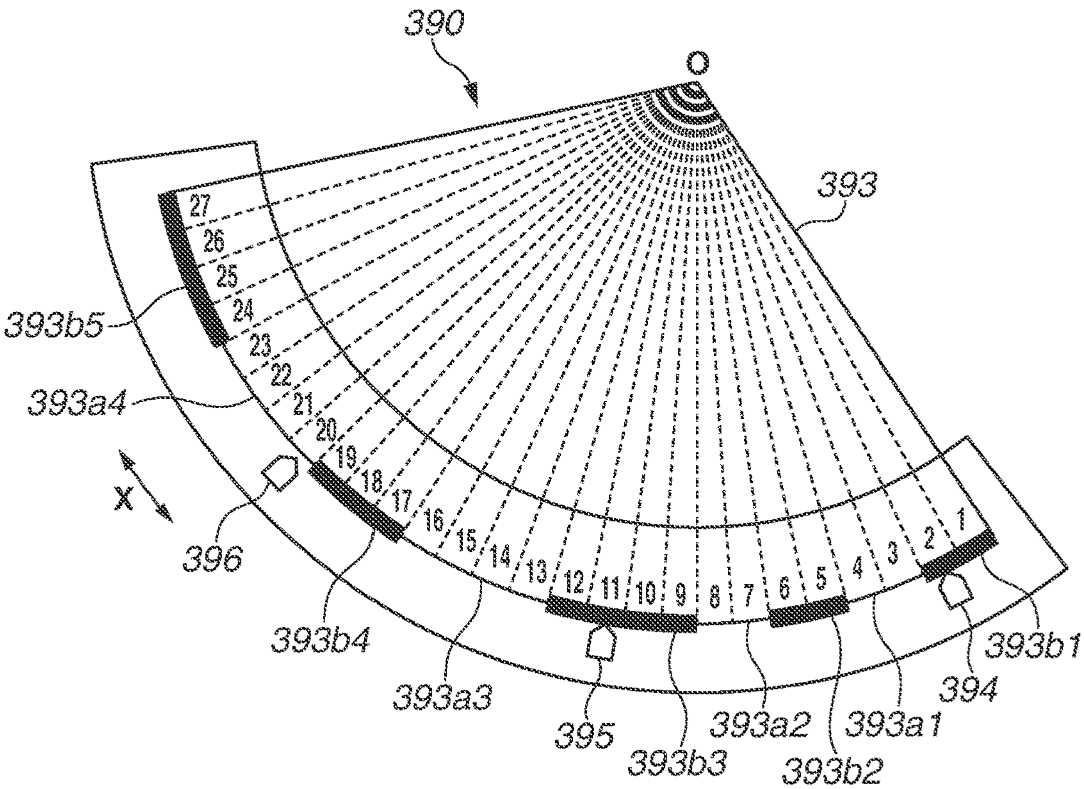
FIG. 6A is a schematic diagram illustrating a belt position detection unit for detecting the position of the fixing belt.
FIG. 6B is a table illustrating combinations of output signals.

In FIG. 6B, the sensor 394 is referred to as a "first sensor", the sensor 395 is referred to as a "second sensor, and the sensor 396 is referred to a "third sensor". A belt position is a value determined by the combination of the output signals of the sensors 394, 395, and 396. In the present exemplary embodiment, the control unit 600 can detect the end position of the fixing belt 310 in steps of nine subdivided positions based on the foregoing belt position determined from the combination of the output signals ("0" or "1") of the sensors 394, 395, and 396.

Figure 7:
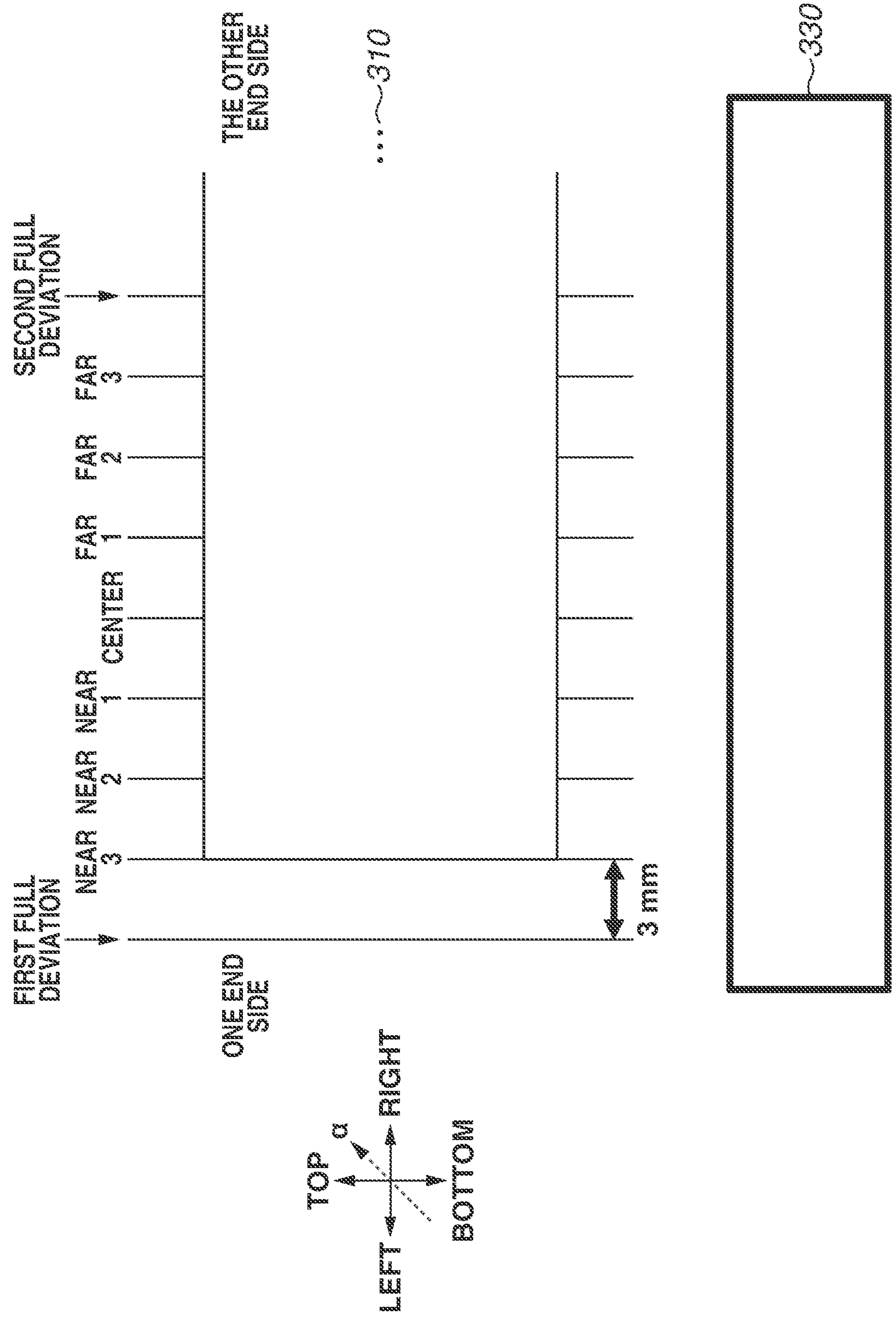
FIG. 7 is a schematic diagram illustrating a belt position in a width direction at one end side of the fixing belt.

The nine subdivided positions of the end position of the fixing belt 310 will be described with reference to FIG. 7. FIG. 7 is a diagram illustrating one end side of the fixing belt 310 as seen in the conveyance direction a with the pressure rotation member 330 down. The detectable positions include a "first full deviation" position where the fixing belt 310 is fully moved to the one end side, a "second full deviation" position where the fixing belt 310 is fully moved to the other end side, and seven equally subdivided positions between the "first full deviation" position and the "second full deviation" position. The seven positions are a "near 3" position, a "near 2" position, a "near 1" position, a "center" position, a "far 1" position, a "far 2" position, and a "far 3" position in order of closeness to the "first full deviation" position. As employed herein, a "near" position refers to a position close to the operation unit 40, and a "far" position refers to a position far from the operation unit 40.

In the present exemplary embodiment, the to-be-detected portions 393*b*1 to 393*b*5 are arranged so that all the sensors 394, 395, and 396 are in the detection state if the fixing belt 310 is at the "first full deviation" position or the "second full deviation" position.

In the present exemplary embodiment, the "near 3" position will be referred to as a first predetermined position, and the "near 1" position will be referred to as a second predetermined position. The "near 1" position is located on the "center" position side of the "near 3" position.

The fixing belt 310 being located at the "center" position means that the center position of the fixing belt 310 in the width direction falls on the center position of the steering roller 350. The fixing belt 310 being located at the "near 1" to "near 3" positions means that the center position of the fixing belt 310 in the width direction falls on the one end side of the center position of the steering roller 350. By contrast, the fixing belt 310 being located at the "far 1" to "far 3" positions means that the center position of the fixing belt 310 in the width direction falls on the other end side of the center position of the steering roller 350. Thus, the sensor unit 390 detecting that the fixing belt 310 is located at the second predetermined position in the width direction means that the fixing belt 310 is located close to the center position of the steering roller 350 compared to when the fixing belt 310 is located at the first predetermined position.

The center position of the fixing belt 310 and that of the steering roller 350 may be somewhat different because of assembly precision.

FIG. 7 illustrates the nine positions from the "first full deviation" position to the "second full deviation" position. The nine positions are arranged at equal distances. In the present exemplary embodiment, the distances are 3 mm (see FIG. 7). In the present exemplary embodiment, the "first full deviation" position is located on the one end side of the steering roller 350. The "center" position is the one at the center of the nine positions arranged at equal distances. The sensor unit 390 detecting that the end of the fixing belt 310 is located at the "center" position means that the fixing belt 310 is located at the center position of the steering roller 350 in the width direction.

As illustrated in FIG. 6A, the sensor flag 393 is a fan-shaped columnar member, and the outer periphery opposed to the sensors 394, 395, and 396 includes the five to-be-detected portions 393*b*1 to 393*b*5. In other words, the four openings 393*a*1 to 393*a*4 are formed in the outer periphery so that the five to-be-detected portions 393*b*1 to 393*b*5 are formed. In the present exemplary embodiment, the three sensors 394, 395, and 396 are arranged at predetermined distances in the moving direction of the sensor flag 393 (direction of the arrow X). The number of to-be-detected portions formed may be greater than or equal to the number of sensors, or four.

The five to-be-detected portions 393*b*1 to 393*b*5 are formed so that, as the sensor flag 393 moves, one of the sensors 394, 395, and 396 is switched between the detection state and the non-detection state at a time. In other words, the to-be-detected portions 393*b*1 to 393*b*5 are formed so that, as the fixing belt 310 moves in the width direction, only one of the output signals of the sensors 394, 395, and 396 changes at a time as illustrated in FIG. 6B. For example, suppose that the sensor flag 393 is circumferentially divided into 27 areas at equal angles about a rotation center O. The to-be-detected portions 393*b*1 to 393*b*5 are formed to have widths as illustrated in FIG. 6A. Specifically, the to-be-detected portions 393*b*1 and 393*b*2 are formed to occupy two areas each, the to-be-detected portions 393*b*3 and 393*b*5 are formed to occupy four areas each, and the to-be-detected portion 393*b*4 is formed to occupy three areas.

As illustrated in FIG. 6B, if the sensor flag 393 illustrated in FIG. 6A is used and the fixing belt 310 (more specifically, the end position thereof) is located at the "second full deviation" position, the output signals of the three sensors 394, 395, and 396 are all "0". In other words, the three sensors 394, 395, and 396 are in the detection state, detecting the to-be-detected portions 393*b*1, 393*b*3, and 393*b*4, respectively. If the fixing belt 310 moves from the "second full deviation" position to the "far 3" position, the output signal of the sensor 396 changes from "0" to "1". The output signals of the other sensors 394 and 395 remain unchanged from "0". In other words, only the output signal of the sensor 396 changes. Here, the sensor 396 is opposed to the opening 393*a*4.

If the fixing belt 310 moves from the "far 3" position to the "far 2" position, only the output signal of the sensor 394 changes from "0" to "1". Here, the sensor 394 is opposed to the opening 393*a*1. If the fixing belt 310 moves from the "far 2" position to the "far 1" position, only the output signal of the sensor 395 changes from "0" to "1". Here, the sensor 395 is opposed to the opening 393*a*3. In other words, all the three sensors 394, 395, and 396 are in the non-detection state, being opposed to the openings 393*a*1, 393*a*3, and 393*a*4, respectively, and not detecting any of the to-be-detected portions 393*b*1 to 393*b*5. All the output signals of the three sensors 394, 395, and 396 are therefore "1".

If the fixing belt 310 moves from the "far 1" position to the "center" position, only the output signal of the sensor 394 changes from "1" to "0". Here, the sensor 394 detects the to-be-detected portion 393*b*2. If the fixing belt 310 moves from the "center" position to the "near 1" position, only the output signal of the sensor 396 changes from "1" to "0". Here, the sensor 396 detects the to-be-detected portion 393*b*5. If the fixing belt 310 moves from the "near 1" position to the "near 2" position, only the output signal of the sensor 394 changes from "0" to "1". Here, the sensor 394 is opposed to the opening 393*a*2. If the fixing belt 310 moves from the "near 2" position to the "near 3" position, only the output signal of the sensor 395 changes from "1" to "0". Here, the sensor 395 detects the to-be-detected portion 393*b*4. If the fixing belt 310 moves from the "near 3" position to the "first full deviation" position, only the output signal of the sensor 394 changes from "1" to "0". Here, the sensor 394 detects the to-be-detected portion 393*b*3. If the fixing belt 310 is located at the "first full deviation" position, the output signals of all the sensors 394, 395, and 396 are "0". In other words, all the three sensors 394, 395, and 396 are in the detection state, detecting the to-be-detected portions 393*b*3, 393*b*4, and 393*b*5, respectively. If the fixing belt 310 moves from the "first full deviation" position to the "second full deviation" position, the output signals of the sensors 394, 395, and 396 change in reverse order to the foregoing. A description thereof will thus be omitted.

If the sensor unit 390 detects that the fixing belt 310 is located at the "first full deviation" position or the "second full deviation" position, the control unit 600 determines that a full deviation error has occurred. The purpose is to prevent the fixing belt 310 from running off the steering roller 350. If the control unit 600 determines that the full deviation error has occurred, the control unit 600 stops the image formation processing and brings the pressure rotation member 330 into the separated state. Moreover, the control unit 600 may display a message that the full deviation error has occurred on the operation unit 40 to notify the user of the full deviation error. The separated state facilitates the serviceperson's recovery operation to bring the image forming apparatus 100 back into the state capable of image formation from the full deviation error.

In the present exemplary embodiment, a method for detecting the position of the fixing belt 310 in the width direction using the belt position detection unit 393 and the sensors 394, 395, and 396 has been described. However, the units for detecting the position of the fixing belt 310 in the width direction are not limited thereto. A line sensor or an eddy current sensor may be used.

<When Pressure Rotation Member is in Contact State>

When the fixing apparatus 30 performs fixing by applying heat and pressure to a recording material bearing an unfixed toner image, the pressure rotation member 330 enters the contact state where the pressure rotation member 330 makes contact with the fixing belt 310 to form the nip portion N. In the contact state, the pressure rotation member 330 presses the fixing pad 380 via the fixing belt 310 with a force of 2000 N. This leaves paper edge scratches on the surface of the fixing belt 310. The paper edge scratches on the surface of the fixing belt 310 can produce uneven gloss as if lines are drawn on the image surface. If the pressure rotation member 330 is in the contact state, steering control is therefore performed on the fixing belt 310 using the steering mechanism 400 to reduce deterioration of the surface of the fixing belt 310 due to the paper edge scratches.

To reduce paper edge scratches, the edges of recording materials are prevented from passing over the same area of the surface of the fixing belt 310 constantly. For that purpose, a configuration is used to reduce the number of positions of the fixing belt 310 at which an operation to tilt the steering roller 350 is performed when the pressure rotation member 330 is in the contact state compared to when the pressure rotation member 330 is in the separated state.

In the present exemplary embodiment, the operation to tilt the steering roller 350 is performed at two positions of the fixing belt 310. In addition, the tilt angle at which the steering roller 350 is tilted is increased, whereby the edges of recording materials are passed over the same area of the surface of the fixing belt 310 less frequently. As a result, deterioration of the surface of the fixing belt 310 due to paper edge scratches can be reduced.

Details of the steering control performed by the steering mechanism 400 when the pressure rotation member 330 is in the contact state will be described below with reference to FIGS. 8, 9, and 10.

In performing the image formation processing, the pressure rotation member 330 enters the contact state.

Figure 8:
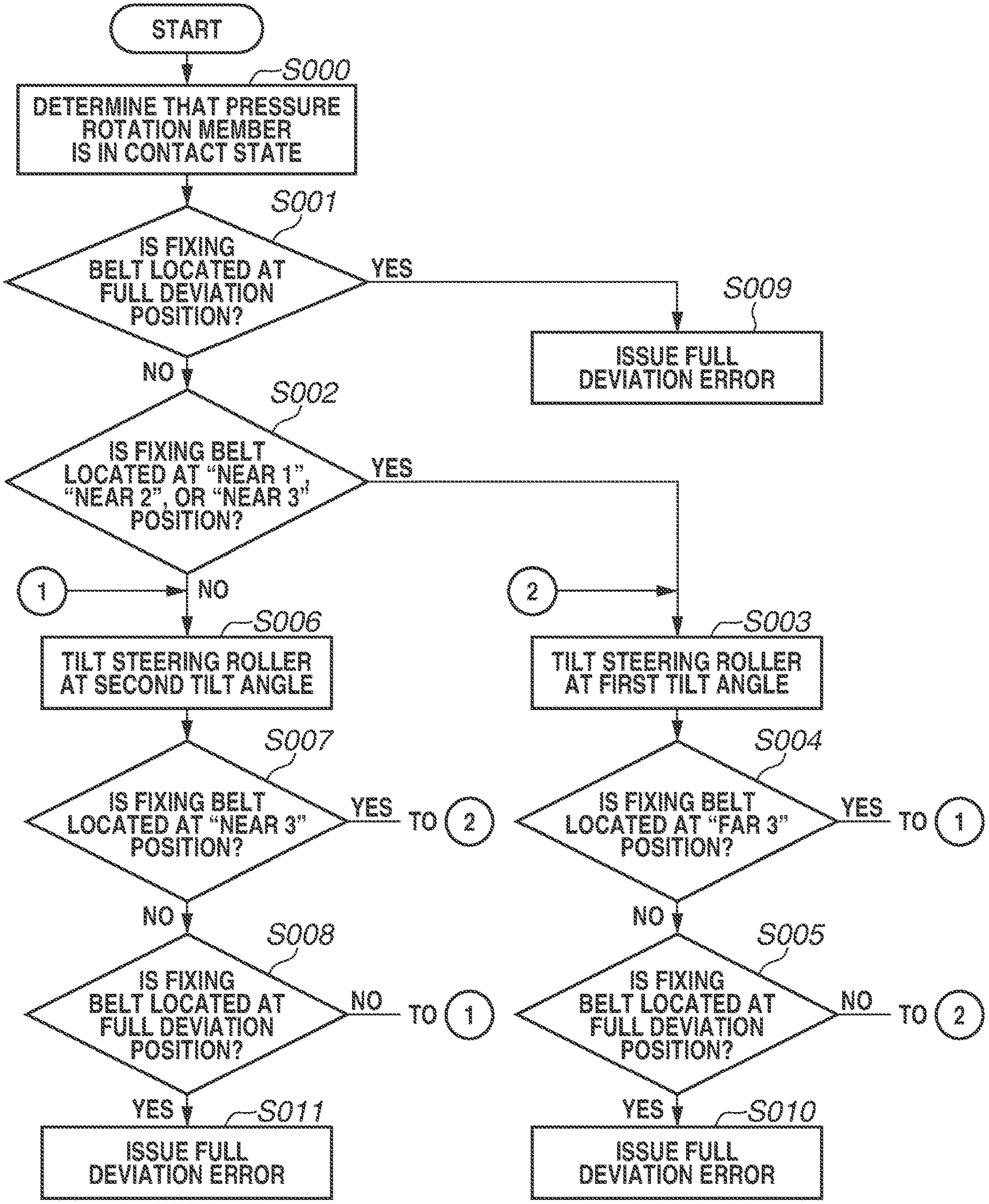
FIG. 8 is a flowchart illustrating steering control with a pressure rotation member in a contact state.

If the control unit 600 determines that the pressure rotation member 330 is in the contact state, the control unit 600 performs steering control by tilting the steering roller 350 based on the position of the fixing belt 310 as illustrated in FIG. 8.

A description will be provided with reference to the flowchart of FIG. 8.

In step S000, the control unit 600 determines that the pressure rotation member 330 is in the contact state.

In step S001, with the pressure rotation member 330 in the contact state, the sensor unit 390 detects the position of the fixing belt 310 for the first time. If the sensor unit 390 detects that the fixing belt 310 is located at the "first full deviation" position or the "second full deviation" position (full deviation position) (YES in step S001), the processing proceeds to step S009. In step S009, the control unit 600 issues a full deviation error. If the fixing belt 310 is detected to not be located at the full deviation position (NO in step S001), the processing proceeds to step S002.

In step S002, the sensor unit 390 detects, by a first detection, that the fixing belt 310 is located at the "near 1", "near 2", or "near 3" position (YES in step S002), the processing proceeds to step S003. If the sensor unit 390 detects, by the first detection, that the fixing belt 310 is located at the "center", "far 1", "far 2", or "far 3" position (NO in step S002), the processing proceeds to step S006.

In step S003, the control unit 600 performs the steering control to tilt the steering roller 350 at a first tilt angle. This enables use of a wide area of the fixing belt 310 in the width direction and can reduce deterioration of the surface of the fixing belt 310.

The first tilt angle will be described with reference to FIG. 10. FIG. 10 is a view in the direction of the arrow a in FIG. 2. Since FIG. 10 is intended to describe the tilt angle of the steering roller 350, the fixing belt 310 is not illustrated. The pressure rotation member 330 is illustrated to the bottom. In FIG. 10, a steering roller 350*a* represents the steering roller 350 situated in parallel with the heating roller 340. The first tilt angle refers to the angle at which the steering roller 350 is tilted with respect to the steering roller 350*a* to move the fixing belt 310 toward the other end of the steering roller 350 in the contact state. In the present exemplary embodiment, the steering roller 350*a* is tilted up to the position of a steering roller 350*b* counterclockwise in FIG. 10. The direction in which the steering roller 350*a* is tilted counterclockwise in FIG. 10 will be referred to as a first direction. As a result, the fixing belt 310 is moved toward the other end of the steering roller 350. The tilt angle from the steering roller 350*a* to the steering roller 350*b* is referred to as the first tilt angle (angle A). In the present exemplary embodiment, the steering roller 350*a* is described to be parallel to the heating roller 340. However, the steering roller 350*a* and the heating roller 340 may be somewhat non-parallel due to variations in assembly precision.

As a result of the operation to tilt the steering roller 350*a* to the position of the steering roller 350*b*, the steering roller 350 is tilted at the first tilt angle.

It takes approximately 1.5 sec to change the tilt angle of the steering roller 350. Therefore, there is a possibility that the fixing belt 310 moves beyond the "near 3" position toward the "first full deviation" position (overshoot). If the fixing belt 310 reaches the "first full deviation" position and the sensor unit 390 detects that the fixing belt 310 is located at the "first full deviation" position, the control unit 600 issues a full deviation error.

The fixing belt 310 can sometimes move beyond the "near 3" position toward the "first full deviation" position and not reach the "first full deviation" position. In such a case, the fixing belt 310 is moved from between the "near 3" position and the "first full deviation" position toward the other end of the steering roller 350 since the steering roller 350 is tilted at the first tilt angle. Here, the sensor unit 390 detects that the fixing belt 310 is located at the "near 3" position, with the steering roller 350 tilted in the first direction at the first tilt angle (angle A).

Since the steering roller 350 is tilted at the first tilt angle, the fixing belt 310 moves to the "near 2", "near 1" (second predetermined position), "center", "far 1", and "far 2" positions in order. As the fixing belt 310 moves toward the other end, the sensor unit 390 detects the position of the fixing belt 310 at the "near 2", "near 1" (second predetermined position), "center", "far 1", and "far 2" positions. In the meantime, the control unit 600 does not perform the operation to change the tilt angle of the steering roller 350 by steering control, and the steering roller 350 remains tilted at the first tilt angle.

Alternatively, the sensor unit 390 may be configured to not detect that the fixing belt 310 is located at the "near 2", "near 1" (second predetermined position), "center", "far 1", or "far 2" position so that the operation to tilt the steering roller 350 by steering control will not be performed.

In step S004, if the fixing belt 310 is moved toward the other end of the steering roller 350 and the sensor unit 390 detects that the fixing belt 310 is located at the "far 3" position (YES in step S004), the processing proceeds to step S006. If the sensor unit 390 does not detect that the fixing belt 310 is located at the "far 3" position (NO in step S004), the processing proceeds to step S005.

In step S005, if the fixing belt 310 is detected to be located at the full deviation position ("second full deviation" position) (YES in step S005), the processing proceeds to step S010. In step S010, the control unit 600 issues a full deviation error. If the fixing belt 310 is not detected to be located at the full deviation position (NO in step S005), the processing returns to step S003.

In step S006, the control unit 600 performs an operation to tilt the steering roller 350 at an angle −A by steering control on the steering mechanism 400. The purpose is to move the fixing belt 310 toward the one end.

Figure 10:
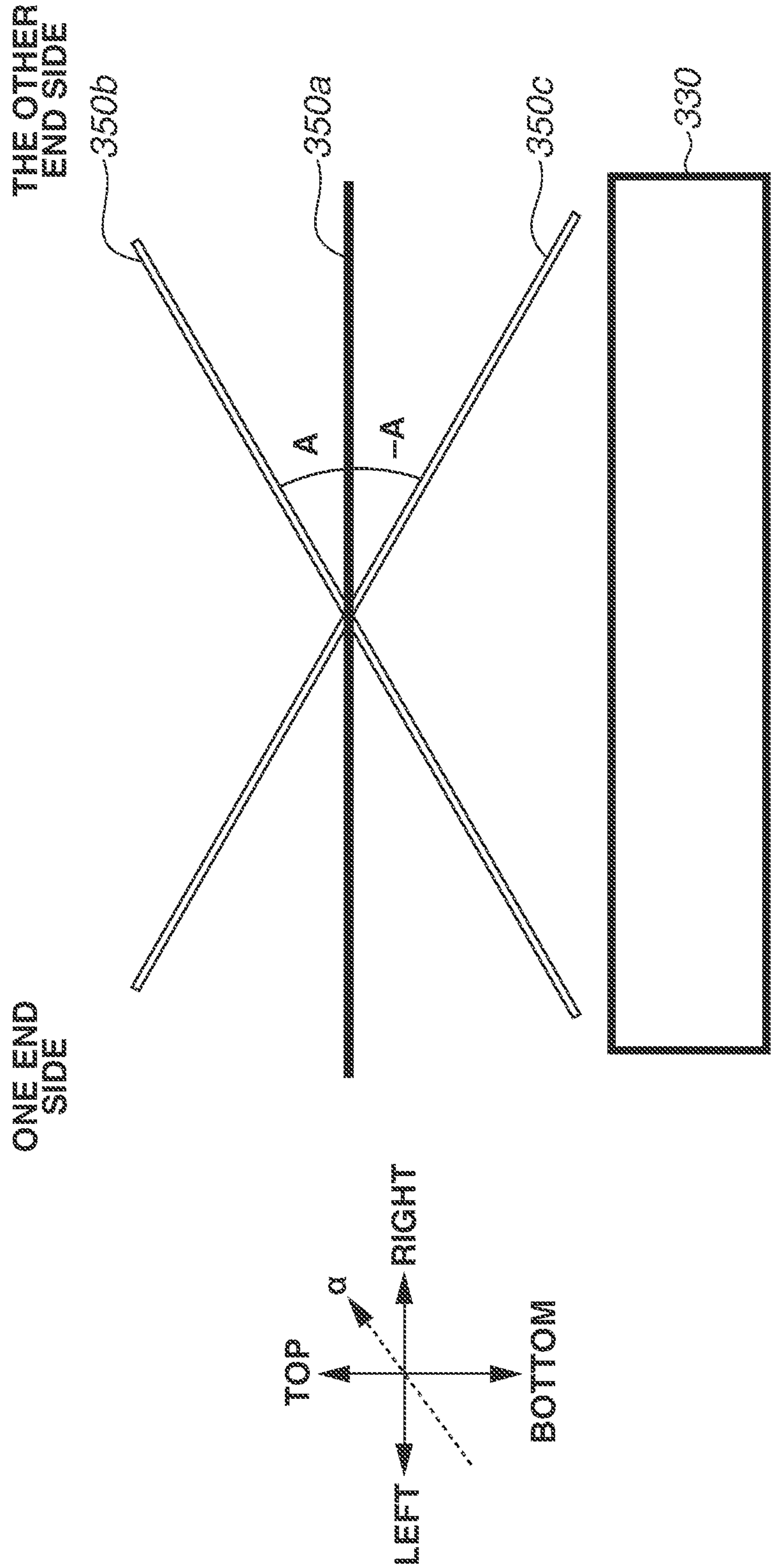
FIG. 10 is a diagram illustrating tilt angles (angles A and −A) of the steering roller.

The steering roller 350*a* in FIG. 10 represents the steering roller 350 situated in parallel with the heating roller 340. The angle −A refers to the angle at which the steering roller 350 is tilted with respect to the steering roller 350*a* to move the fixing belt 310 toward the one end of the steering roller 350. In the present exemplary embodiment, the control unit 600 performs an operation to tilt the steering roller 350*a* to the position of a steering roller 350*c* clockwise in FIG. 10. The direction in which the steering roller 350*a* is tilted clockwise in FIG. 10 will be referred to as a second direction. In other words, the second direction is the direction where the steering roller 350 is tilted clockwise reverse to the first direction where the steering roller 350 is tilted counterclockwise in FIG. 10. The fixing belt 310 is thereby moved toward the one end of the steering roller 350. The tilt angle from the steering roller 350*a* to the steering roller 350*c* here is referred to as the angle −A.

As a result of the operation to tilt the steering roller 350*a* to the position of the steering roller 350*c*, the steering roller 350 is tilted at the angle −A.

It takes approximately 1.5 sec to change the tilt angle of the steering roller 350. Therefore, there is a possibility that the fixing belt 310 moves beyond the "far 3" position toward the "second full deviation" position (overshoot). If the fixing belt 310 reaches the "second full deviation" position and the sensor unit 390 detects that the fixing belt 310 is located at the "second full deviation" position, the control unit 600 issues a full deviation error.

The fixing belt 310 can sometimes move beyond the "far 3" position toward the "second full deviation" position and not reach the "second full deviation" position. In such a case, the fixing belt 310 is moved from between the "far 3" position and the "second full deviation" position toward the one end of the steering roller 350 since the steering roller 350 is tilted at the angle −A. Here, the sensor unit 390 detects that the fixing belt 310 is located at the "far 3" position, with the steering roller 350 tilted at the angle −A.

Since the steering roller 350 is tilted at angle −A, the fixing belt 310 moves to the "far 2", "far 1", "center", "near 1" (second predetermined position), and "near 2" positions in order. As the fixing belt 310 moves toward the one end, the sensor unit 390 detects the position of the fixing belt 310 at the "far 2", "far 1", "center", "near 1" (second predetermined position), and "near 2" positions. In the meantime, the control unit 600 does not perform the operation to change the tilt angle of the steering roller 350 by steering control, and the steering roller 350 remains tilted at the angle −A.

Alternatively, the sensor unit 390 may be configured to not detect that the fixing belt 310 is located at the "far 2", "far 1", "center", "near 1" (second predetermined position), or "near 2" position so that the operation to tilt the steering roller 350 by steering control will not be performed.

In step S007, if the fixing belt 310 is moved toward the one end of the steering roller 350 and the sensor unit 390 detects that the fixing belt 310 is located at the "near 3" position (first predetermined position) (YES in step S007), the processing proceeds to step S003. If the sensor unit 390 does not detect that the fixing belt 310 is located at the "near 3" position (first predetermined position) (NO in step S007), the processing proceeds to step S008.

In step S008, if the fixing belt 310 is detected to be located at the full deviation position ("first full deviation" position) (YES in step S008), the processing proceeds to step S011. In step S011, the control unit 600 issues a full deviation error. If the fixing belt 310 is not detected to be located at the full deviation position (NO in step S008), the processing returns to step S006.

Figure 9:
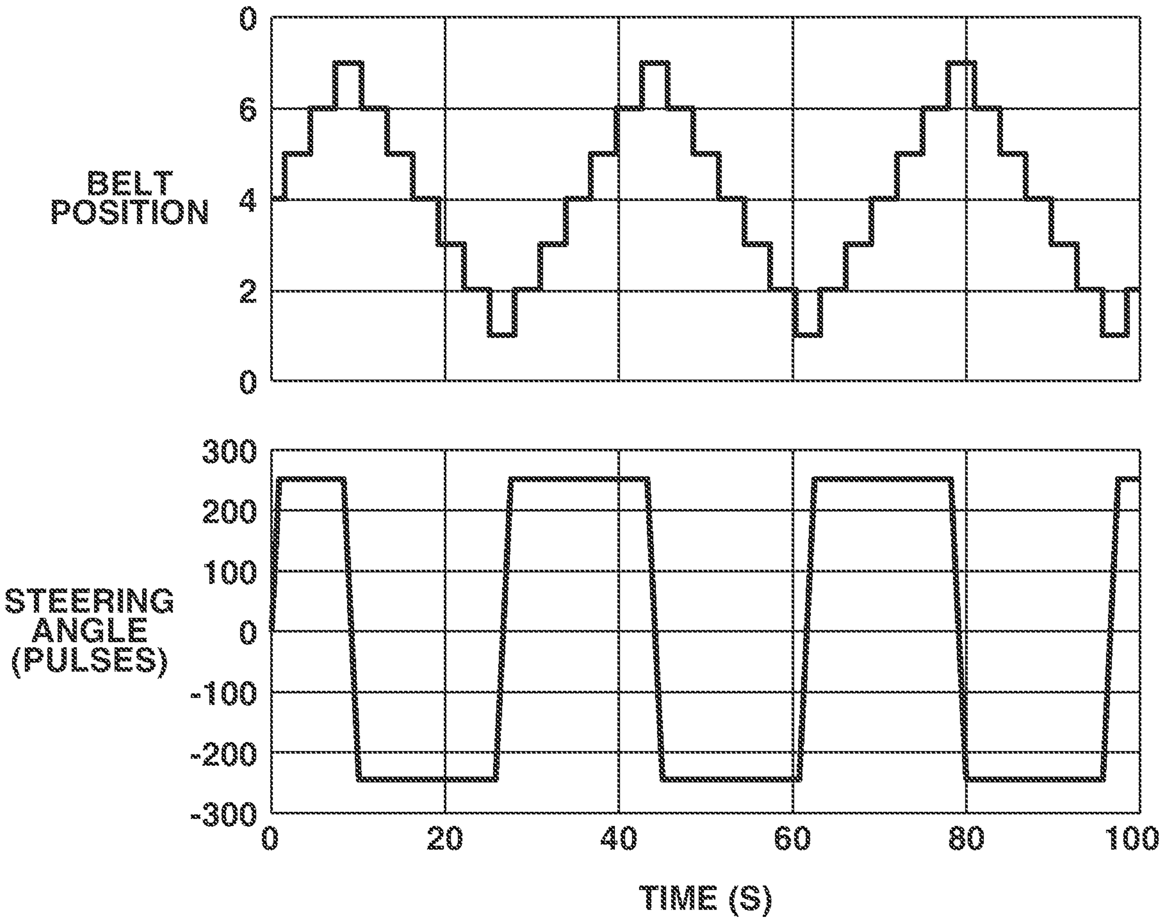
FIG. 9 is a diagram illustrating a relationship between the belt position and a tilt angle of a steering roller with the pressure rotation member in the contact state.

As illustrated in FIG. 9, if the pressure rotation member 330 is in the contact state, the steering roller 350 is tilted at the angle A or angle −A. The operation to tilt the steering roller 350 is not performed when the fixing belt 310 is at the "near 1", "near 2", "far 1", or "far 2" position. The operation to tilt the steering roller 350 is performed at the "near 3" and "far 3" positions. The fixing belt 310 thus reciprocates between the "near 3" position (first predetermined position) and the "far 3" position. In other words, the fixing belt 310 can thus reciprocate over a wider range in the width direction than in the separated state to be described below, without causing a full deviation error. This can reduce deterioration of the surface of the fixing belt 310 due to paper edge scratches.

While the steering control is described to be performed at the "near 3" and "far 3" positions, the steering control may also be performed at the "near 2" and "far 2" positions. In such a case, if the sensor unit 390 detects that the fixing belt 310 is located at the "near 2" position, the operation to tilt the steering roller 350 is performed. The tilted position of the steering roller 350 here falls on the steering roller 350*a* side of the steering roller 350*b*. Similarly, if the sensor unit 390 detects that the fixing belt 310 is located at the "far 2" position, the operation to tilt the steering roller 350 is performed. The tilted position of the steering roller 350 here falls on the steering roller 350*a* side of the steering roller 350*c*.

If the pressure rotation member 330 is in the contact state, the steering control does not necessarily need to be performed as described above. For example, the reciprocation range of the fixing belt 310 may be changed depending on the type of recording material used. While the tilt angles of the steering rollers 350 are described to be the angles A and −A, this is not restrictive. The tilt angles may be changed depending on the type of recording material used.

<When Pressure Rotation Member is in Separated State>

During a print job, recording materials are continuously conveyed into the nip portion N for fixing. The pressure rotation member 330 is thus maintained in the contact state during a print job. However, the pressure rotation member 330 sometimes enters the separated state even during a print job. Examples include when different print jobs are continuously printed and there is a delay in an image formation signal. Another example is when post-processing such as a stapling operation in an accessory device takes long. Moreover, in performing fixing on a low-grammage recording material after a high-grammage recording material, the pressure rotation member 330 can be separated from the fixing belt 310 to lower the temperature of the fixing belt 310, or the fixing temperature. In such cases, the fixing apparatus 30 enters a non-sheet passing state where no sheet is conveyed to the nip portion N.

In the non-sheet passing state, the surface temperature of the pressure rotation member 330 can be excessively increased by the heat of the fixing belt 310. If fixing is performed on a recording material with the pressure rotation member 330 overheated, the toner is melted excessively. The excessively melted toner can adhere to the surface of the pressure rotation member 330 or the fixing belt 310 and re-adhere to a subsequent recording material. An area of the recording material to which the toner re-adheres can be an image defect.

To prevent the occurrence of the image defect due to an increase in the temperature of the pressure rotation member 330, the pressure rotation member 330 is brought into the separated state during the non-sheet passing state.

When the pressure rotation member 330 is in the separated state, the fixing belt 310 is released from the pressing force of 2000 N. This increases the widthwise reciprocation speed of the fixing belt 310 by the steering control by approximately twice to three times compared to when the pressure rotation member 330 is in the contact state. Suppose that the steering control is performed under the same condition as when the pressure rotation member 330 is in the contact state, i.e., to change the tilt angle of the steering roller 350 at the "near 3" position (first predetermined position) and the "far 3" position. This can cause an overshoot of the fixing belt 310 to the full deviation position side, causing a full deviation error. Furthermore, the fixing belt 310 can even exceed the full deviation position and run off the steering roller 350.

The full deviation error can be prevented by reducing the rotation speed of the fixing belt 310. However, the non-sheet passing state discussed here lasts only several seconds (approximately four seconds) between sheets. If the rotation speed of the fixing belt 310 is sufficiently reduced to an extent that can prevent the full deviation error, then it takes long to restore the rotation speed to the original rotation speed immediately before the non-sheet passing state. If the rotation speed of the fixing belt 310 is unable to be restored before the next recording material is conveyed to the nip portion N, productivity drops. The occurrence of the full deviation error is therefore desirably prevented while maintaining the productivity.

When the pressure rotation member 330 is in the separated state, the nip portion N is not formed and the surface of the fixing belt 310 will not be deteriorated by the edges of recording materials. When the pressure rotation member 330 is in the separated state, the fixing belt 310 therefore does not need to be reciprocated over a wide range in the width direction as with the steering control in the contact state. In other words, the fixing belt 310 can be reciprocated over a narrower range than when the pressure rotation member 330 is in the contact state.

If the pressure rotation member 330 is in the separated state, the reciprocation speed of the fixing belt 310 is twice to three times as fast as that in the contact state. Moreover, if the pressure rotation member 330 is in the separated state, the surface of the fixing belt 310 will not be deteriorated by the edges of recording materials. For such reasons, if the pressure rotation member 330 is in the separated state, steering control is performed so that the center position of the fixing belt 310 is maintained at the center position of the steering roller 350. This can prevent the occurrence of a full deviation error that is caused by the fixing belt 310 reaching a full deviation position while the pressure rotation member 330 is in the separated state. The present exemplary embodiment is configured so that the number of positions of the fixing belt 310 at which to perform the operation to tilt the steering roller 350 here is greater than when the pressure rotation member 330 is in the contact state, i.e., two.

In the present exemplary embodiment, the rotation speed of the fixing belt 310 when the pressure rotation member 330 is in the separated state is the same as that of the fixing belt 310 when the pressure rotation member 330 is in the contact state. Moreover, to prevent a full deviation error, the fixing belt 310 is reciprocated over a narrower area than that in the contact state. As employed herein, the rotation speed being the same may cover a configuration where the rotation speed of the fixing belt 310 is reduced without lowering the productivity.

Details of control in the case where the control unit 600 determines that the pressure rotation member 330 is in the separated state will be described below.

The sensor unit 390 detects the position of the fixing belt 310. The control unit 600 performs the operation to tilt the steering roller 350 based on the position of the fixing belt 310 in the width direction.

Details of the method for determining the tilt angle according to a first exemplary embodiment will be described in detail below.

Figure 13:
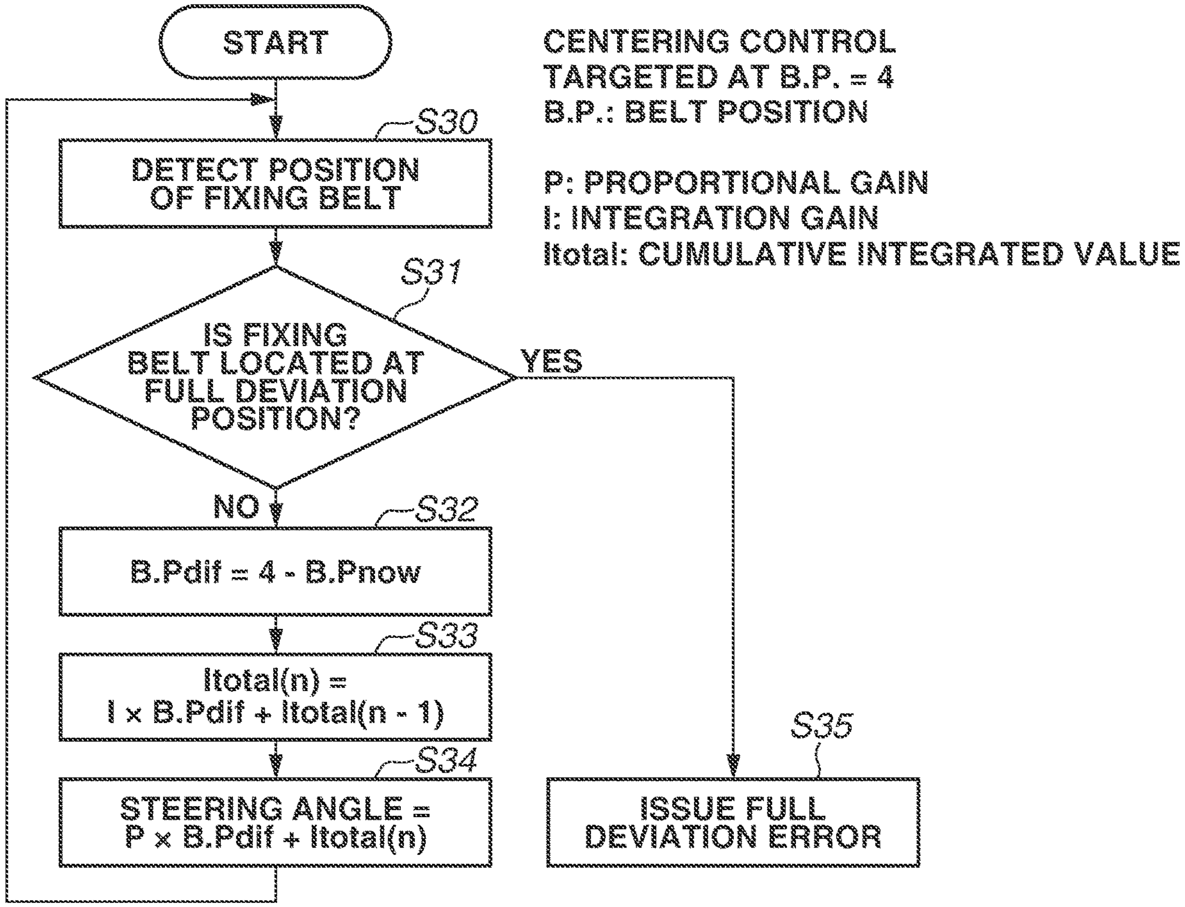
FIG. 13 is a flowchart illustrating steering control with the pressure rotation member in a separated state according to a first exemplary embodiment.

In the present exemplary embodiment, a target position of the fixing belt 310 is set (in the present exemplary embodiment, the target position is the "center" position), and the operation to tilt the steering roller 350 is performed to move the fixing belt 310 to the target position. A specific method for determining the tilt angle in the separated state will be described with reference to the flowchart of FIG. 13.

First, in step S30, the sensor unit 390 detects the position of the fixing belt 310.

In step S31, if the fixing belt 310 is located at a full deviation position (YES in step S31), the processing proceeds to step S35. In step S35, the control unit 600 issues a full deviation error.

If the fixing belt 310 is not located at a full deviation position (NO in step S31), the processing proceeds to step S32.

In step S32, the control unit 600 determines a difference B.Pdif from the "center" position, or target position, based on the detection result (B.Pnow) of the sensor unit 390:

$$B.P\text{dif}=4-B.P\text{now}. \quad \text{Eq. 1}$$

Possible numerical values of B.Pnow are 1 to 7. FIG. 17 illustrates a relationship between the position of the fixing belt 310 and the numerical value to be substituted into B.Pnow. For example, if the fixing belt 310 is at the "near 3" position (first predetermined position), the control unit 600 substitutes 1 into B.Pnow. If the fixing belt 310 is at the "far 3" position, the control unit 600 substitutes 7 into B.Pnow.

In step S33, the control unit 600 adds the product of the difference B.Pdif and an integration gain I to the previous cumulative integrated value Itotal:

$$I\text{total}(n)=I\times B.P\text{dif}+I\text{total}(n-1). \quad \text{Eq. 2}$$

Here, the initial value of Itotal is 0.

In step S34, the control unit 600 determines the sum of the product of the difference B.Pdif and a proportional gain P and the cumulative integrated value Itotal(n) as a steering angle:

$$\text{Steering angle}=P\times B.P\text{dif}+I\text{total}(n). \quad \text{Eq. 3}$$

In the present exemplary embodiment, the proportional gain P is 100, the integration gain I is 1, and the calculation is performed every 0.2 sec. For example, if the detection result of the sensor unit 390 is the "far 1" position, the control unit 600 substitutes 5 into B.Pnow. In such a case, the steering angle is given by the following equation:

$$\text{Steering angle}=100\times(4-5)+1\times(4-5)+I\text{total}(n-1)=-101+I\text{total}(n-1).$$

The tilt angle of the steering roller 350 is determined from the value of the steering angle determined by the foregoing calculation.

The tilt angle can be positive or negative with respect to the steering roller 350*a*. If the value determined by Eqs. 1 to 3 is positive, the operation to tilt the steering roller 350 is performed to move the fixing belt 310 toward the other end of the steering roller 350. In such a case, the steering roller 350 is tilted counterclockwise in FIG. 10. Similarly, if the value of the steering angle is negative, the operation to tilt the steering roller 350 is performed to move the fixing belt 310 toward the one end of the steering roller 350. In such a case, the steering roller 350 is tilted clockwise in FIG. 10.

FIG. 10 illustrates the case where the steering roller 350*a* has a steering angle of 0 and is parallel to the heating roller 340. However, this is not restrictive. Since the steering roller 350*a* can be non-parallel to the heating roller 340 due to variations in assembly precision, some offset is allowable.

The greater the absolute value of the determined steering angle, the greater the amount of clockwise or counterclockwise movement of the steering roller 350.

In other words, the farther from the "center" position, or the target position, the position of the fixing belt 310 in the width direction is, the greater the tilt angle of the steering roller 350 becomes. From Eqs. 1, 2, and 3, if the fixing belt 310 is located at the "center" position, or the target position, the steering angle according to the present exemplary embodiment is 0. The steering roller 350 is tilted to maintain the fixing belt 310 at the "center" position. This prevents the fixing belt 310 from moving from the target position toward the one end or the other end of the steering roller 350 if the fixing belt 310 is located at the "center" position, or the target position.

The foregoing steering control is implemented by performing the operation to tilt the steering roller 350 based on the position of the fixing belt 310 in the width direction. In other words, the operation to tilt the steering roller 350 is performed to maintain the fixing belt 310 at the "center" position in the width direction.

The foregoing steering control is characterized in that, compared to the contact state, the positions of the fixing belt 310 at which the operation to tilt the steering roller 350 is performed in the separated state fall on the "center" position side of those positions in the contact state and even on the "center" position in the width direction. The number of positions of the fixing belt 310 in the width direction at which the operation to tilt the steering roller 350 is performed is therefore greater when the pressure rotation member 330 is in the separated state than when the pressure rotation member 330 is in the contact state. A description thereof will be provided with reference to FIG. 11.

In the contact state according to the present exemplary embodiment, the operation to tilt the steering roller 350 is not performed at the "near 1" position (second predetermined position). By contrast, in the separated state, an operation to tilt the steering roller 350 at a second tilt angle (angle B in FIG. 11) is performed at the "near 1" position (second predetermined position).

Figure 11:
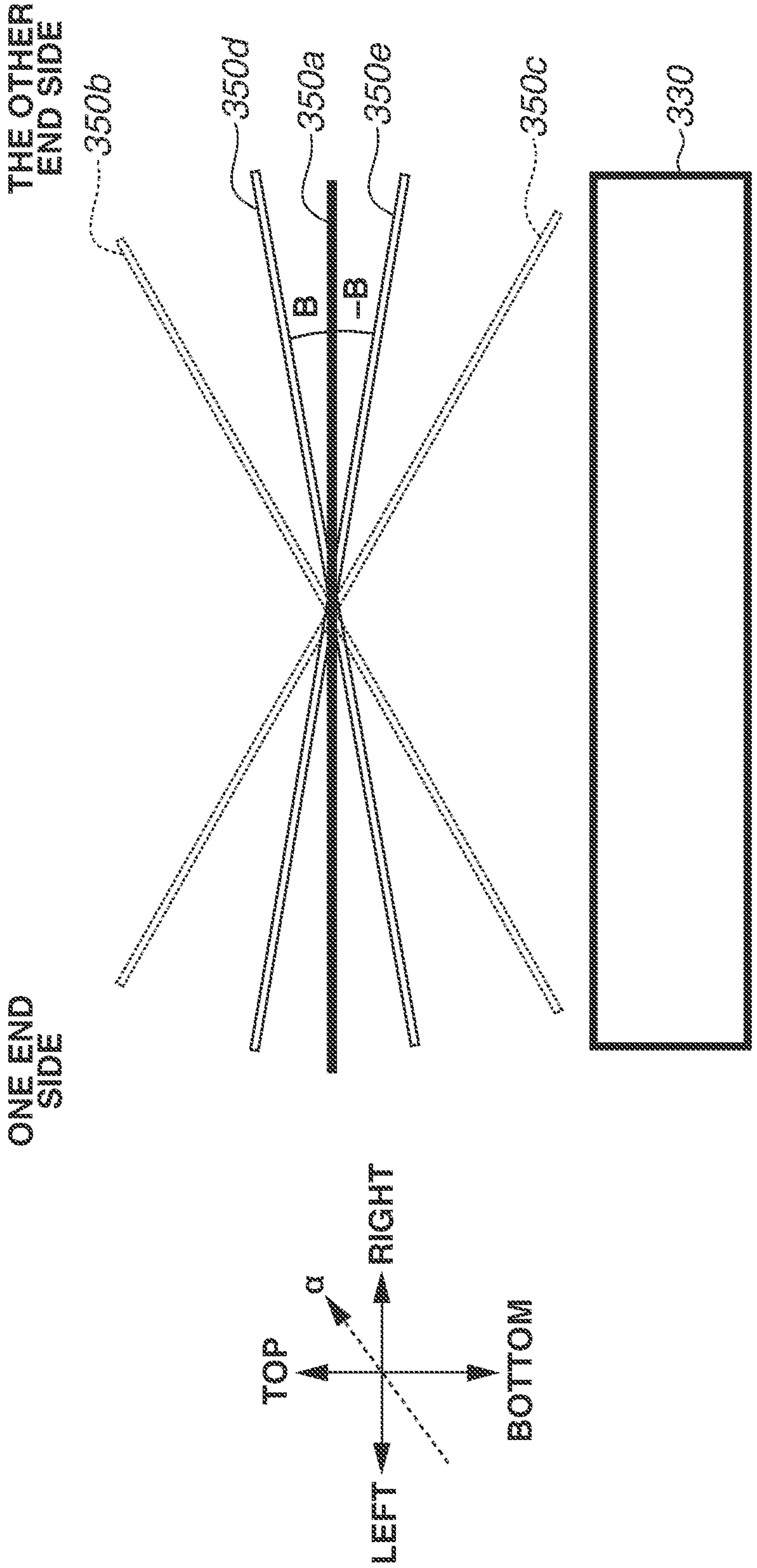
FIG. 11 is a diagram illustrating tilt angles (angles B and −B) of the steering roller.

In FIG. 11, the second tilt angle is an angle at which the steering roller 350 is tilted with respect to the steering roller 350*a* to move the fixing belt 310 toward the other end of the steering roller 350. If the steering roller 350 is tilted in the first direction, i.e., counterclockwise in the diagram, the fixing belt 310 moves toward the other end of the steering roller 350. If the sensor unit 390 detects that the fixing belt 310 is located at the "near 1" position (second predetermined position), the control unit 600 tilts the steering roller 350 to the position of a steering roller 350*d* that is a position on the steering roller 350*a* side of the steering roller 350*b*. The tilt angle here is referred to as the second tilt angle (angle B). In other words, the first tilt angle >the second tilt angle.

Similarly, if the sensor unit 390 detects that the fixing belt 310 is located at the "far 1" position, the control unit 600 tilts the steering roller 350 in the second direction, i.e., clockwise in the diagram. The fixing belt 310 is thereby moved toward the one end of the steering roller 350. Here, the steering roller 350 is tilted to the position of a steering roller 350*e* (angle −B) that is a position tilted toward the steering roller 350*a* compared to the case where the steering roller 350 is tilted at angle −A.

In the separated state, the operation to tilt the steering roller 350 at a third tilt angle is further performed at the "near 2" position (third predetermined position).

Figure 12:
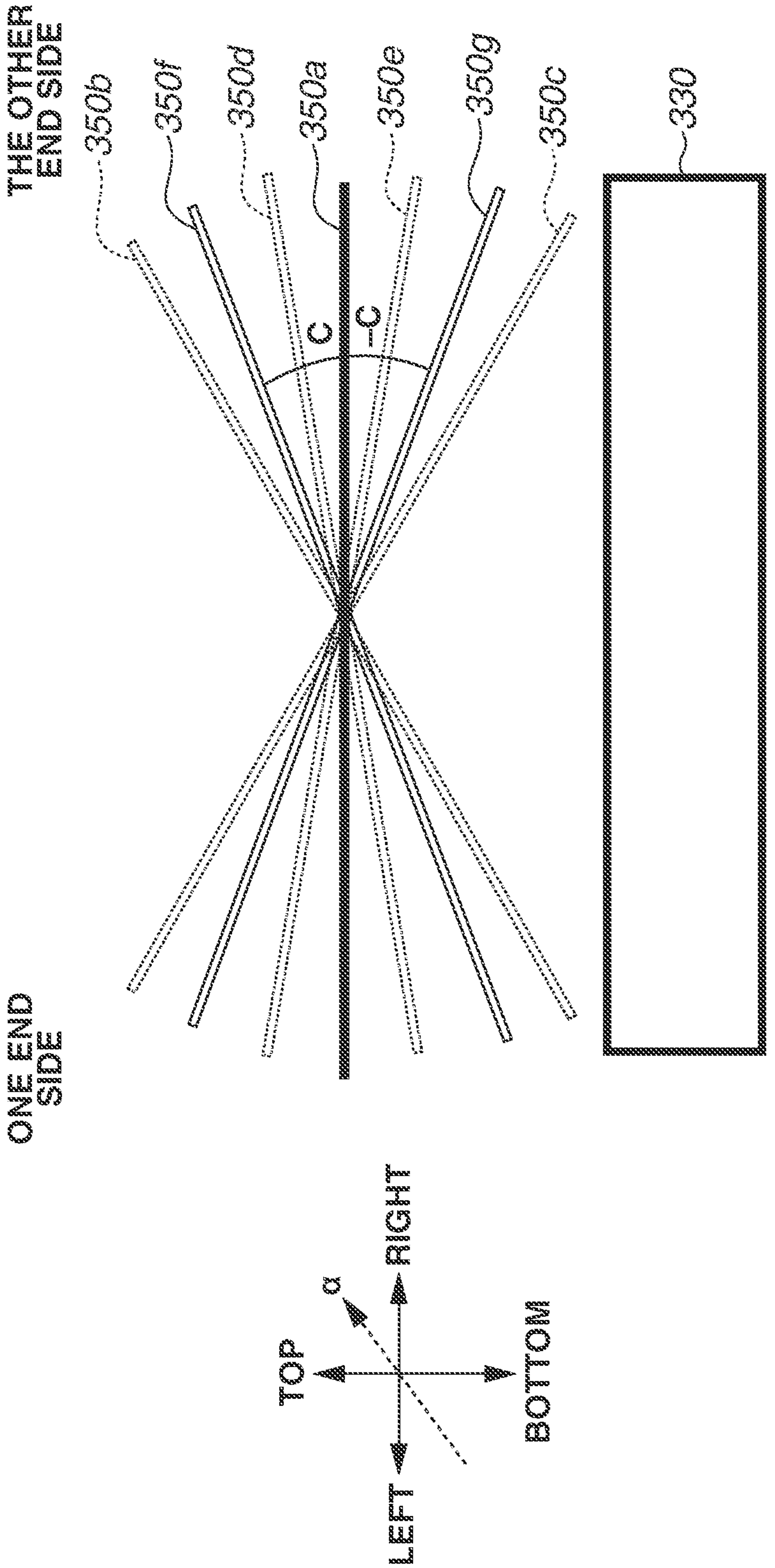
FIG. 12 is a diagram illustrating tilt angles (angles C and −C) of the steering roller.

In FIG. 12, the third tilt angle is an angle at which the steering roller 350 is tilted from the steering roller 350*a* to move the fixing belt 310 toward the other end of the steering roller 350. If the steering roller 350 is tilted counterclockwise in the diagram, the fixing belt 310 moves toward the other end of the steering roller 350. If the sensor unit 390 detects that the fixing belt 310 is located at the "near 2" position (third predetermined position), the control unit 600 tilts the steering roller 350 to the position of a steering roller 350*f* that is a position tilted toward the steering roller 350*b* compared to the case where the steering roller 350 is tilted at the second tilt angle. The tilt angle here is referred to as the third tilt angle (angle C). In other words, the third tilt angle >the second tilt angle.

Similarly, if the sensor unit 390 detects that the fixing belt 310 is located at the "far 2" position, the control unit 600 tilts the steering roller 350 in the second direction, i.e., clockwise in the diagram. The fixing belt 310 is thereby moved toward the one end of the steering roller 350. In such a case, the steering roller 350 is tilted to the position of a steering roller 350*g* (angle −C) that is a position tilted toward the steering roller 350*c* compared to the case where the steering roller 350 is tilted at angle −B.

The steering roller 350 is tilted at the angle B, −B, C, or −C. While an amount of change in the tilt angle of the steering roller 350 by a single tilt operation in the contact state is from the angle A to angle −A, the amount of change in the tilt angle of the steering roller 350 by a single tilt operation in the separated state is from the angle C to angle −C at maximum. The amount of change in the tilt angle of the steering roller 350 by a single tilt operation in the separated state is thus smaller than that in the contact state. This facilitates maintaining the fixing belt 310 at the center of the steering roller 350.

If the pressure rotation member 330 is in the contact state, the operation to tilt the steering roller 350 is not performed at the "near 1", "near 2", "far 1", or "far 2" position. By contrast, if the pressure rotation member 330 is in the separated state, the operation to tilt the steering roller 350 is performed at the "near 1", "near 2", "far 1", and "far 2" positions.

Figure 14:
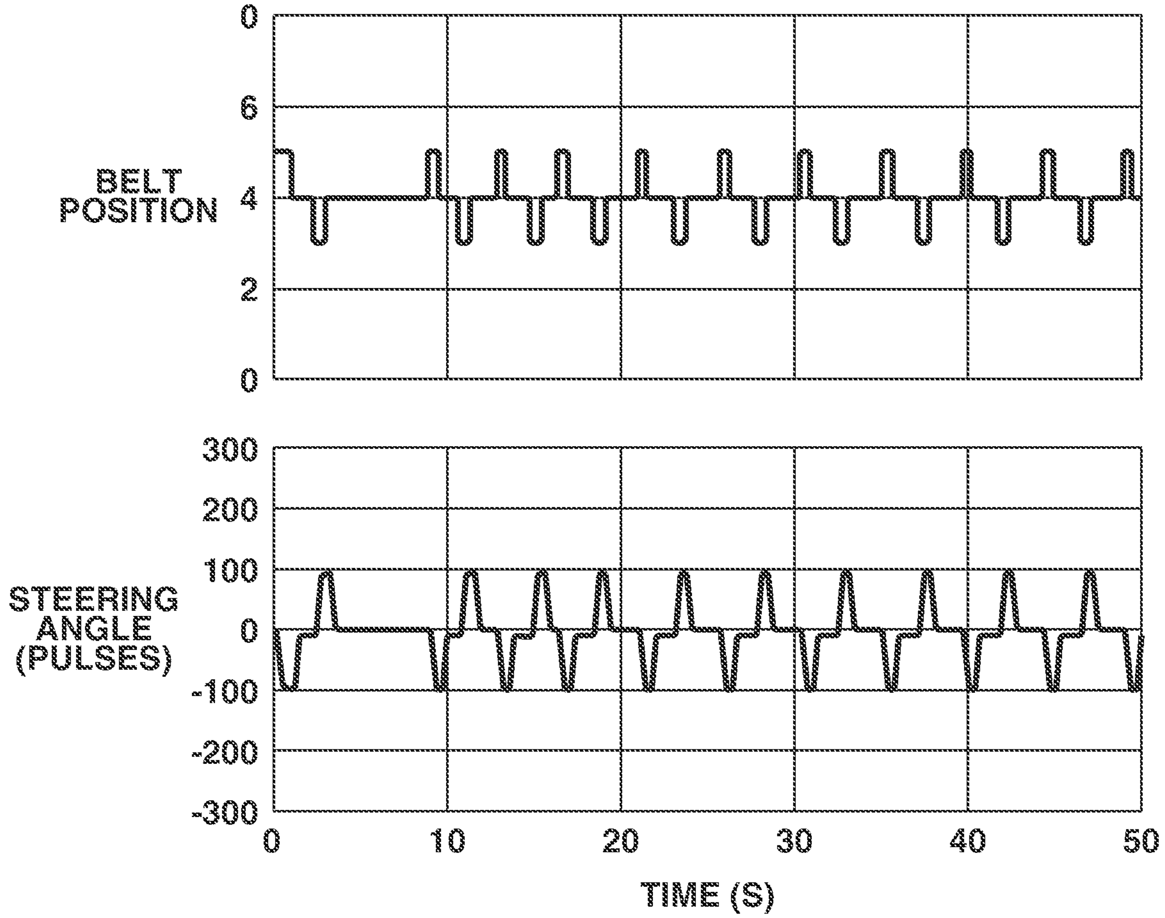
FIG. 14 is a diagram illustrating a relationship between the belt position and the tilt angle of the steering roller with the pressure rotation member in the separated state according to the first exemplary embodiment.

As illustrated in FIG. 14, by performing the foregoing steering control, the fixing belt 310 can be reciprocated within a narrower range than when the pressure rotation member 330 is in the contact state.

Specifically, in the present exemplary embodiment, if the pressure rotation member 330 is in the separated state, a range of movement of the fixing belt 310 in the width direction is between the "near 1" position and the "far 1" position. By contrast, if the pressure rotation member 330 is in the contact state, the range of movement of the fixing belt 310 in the width direction is between the "near 3" position and the "far 3" position.

The distance between the center position of the range of movement of the fixing belt 310 and the center position of the fixing belt 310 in the width direction increases as the fixing belt 310 moves from the "far 1" position to the "far 3" position. Similarly, the distance increases as the fixing belt 310 moves from the "near 1" position to the "near 3" position. In the separated state, the first operation to tilt the steering roller 350 after the fixing belt 310 moves from the "center" position is performed when the fixing belt 310 is located at the "near 1" position or the "far 1" position. By contrast, in the contact state, the first operation is performed when the fixing belt 310 is located at the "near 3" position or the "far 3" position. Thus, the distance between the center position of the fixing belt 310 where the first operation to tilt the steering roller 350 is performed after the center position of the fixing belt 310 is separated from the center position of the range of movement of the fixing belt 310, and the center position of the range of movement of the fixing belt 310 in the width direction can be said to be smaller when the pressure rotation member 330 is in the separated state than when the pressure rotation member 330 is in the contact state.

A modification (second exemplary embodiment) will be described with reference to the flowchart of FIG. 15.

Figure 15:
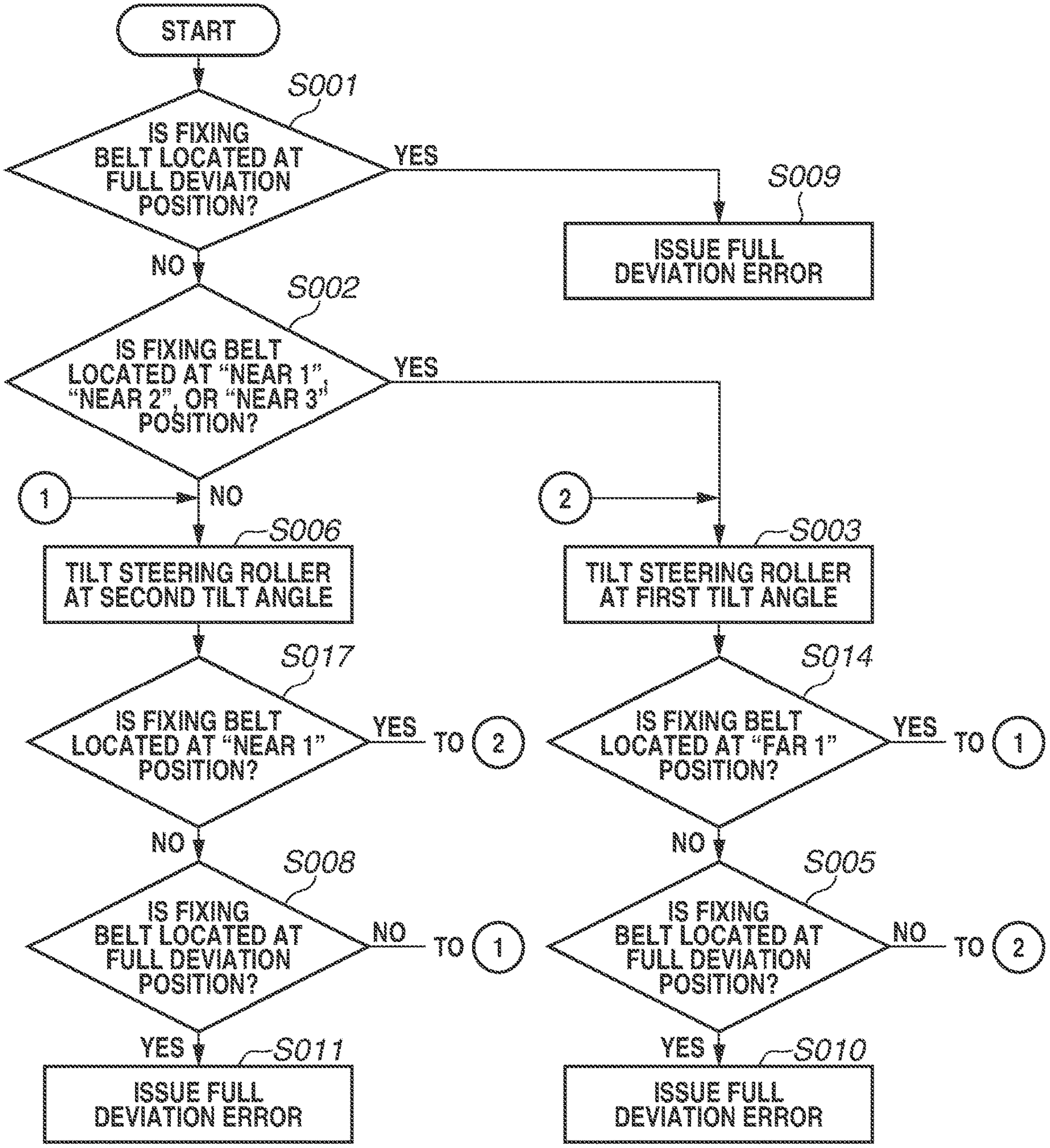
FIG. 15 is a flowchart illustrating steering control with the pressure rotation member in the separated state according to a modification.

FIG. 15 is a flowchart where step S007 'IS FIXING BELT LOCATED AT "NEAR 3" POSITION?' in the flowchart for the contact state in FIG. 8 is modified into 'IS FIXING BELT LOCATED AT "NEAR 1" POSITION?', and step S004 'IS FIXING BELT LOCATED AT "FAR 3" POSITION?' is modified into 'IS FIXING BELT LOCATED AT "FAR 1" POSITION?'.

A description redundant with that of the first exemplary embodiment will be omitted.

Since the steering roller 350 is tilted at the first tilt angle in step S003, the fixing belt 310 moves toward the other end past the "center" position. While the fixing belt 310 moves toward the other end, the sensor unit 390 detects the position of the fixing belt 310, whereas the control to change the tilt angle of the steering roller 350 by steering control is not performed at the "center" position. The steering roller 350 is maintained at the first tilt angle. In step S014, if the fixing belt 310 moves toward the other end of the steering roller 350 and the sensor unit 390 detects that the fixing belt 310 is located at the "far 1" position (YES in step S014), the processing proceeds to step S006. If the sensor unit 390 does not detect that the fixing belt 310 is located at the "far 1" position (NO in step S014), the processing proceeds to step S005.

In step S017, if the fixing belt 310 moves toward the one end of the steering roller 350 and the sensor unit 390 detects that the fixing belt 310 is located at the "near 1" position (YES in step S017), the processing proceeds to step S003. If the sensor unit 390 does not detect that the fixing belt 310 is located at the "near 1" position (NO in step S017), the processing proceeds to step S008.

It takes approximately 1.5 sec to change the tilt angle of the steering roller 350. Thus, there is a possibility of "overshoot" where the fixing belt 310 moves up to a full deviation position because the steering control is too late. However, performing the steering control at the "near 1" and "far 1" positions can prevent the fixing belt 310 from moving up to the full deviation positions.

Figure 16:
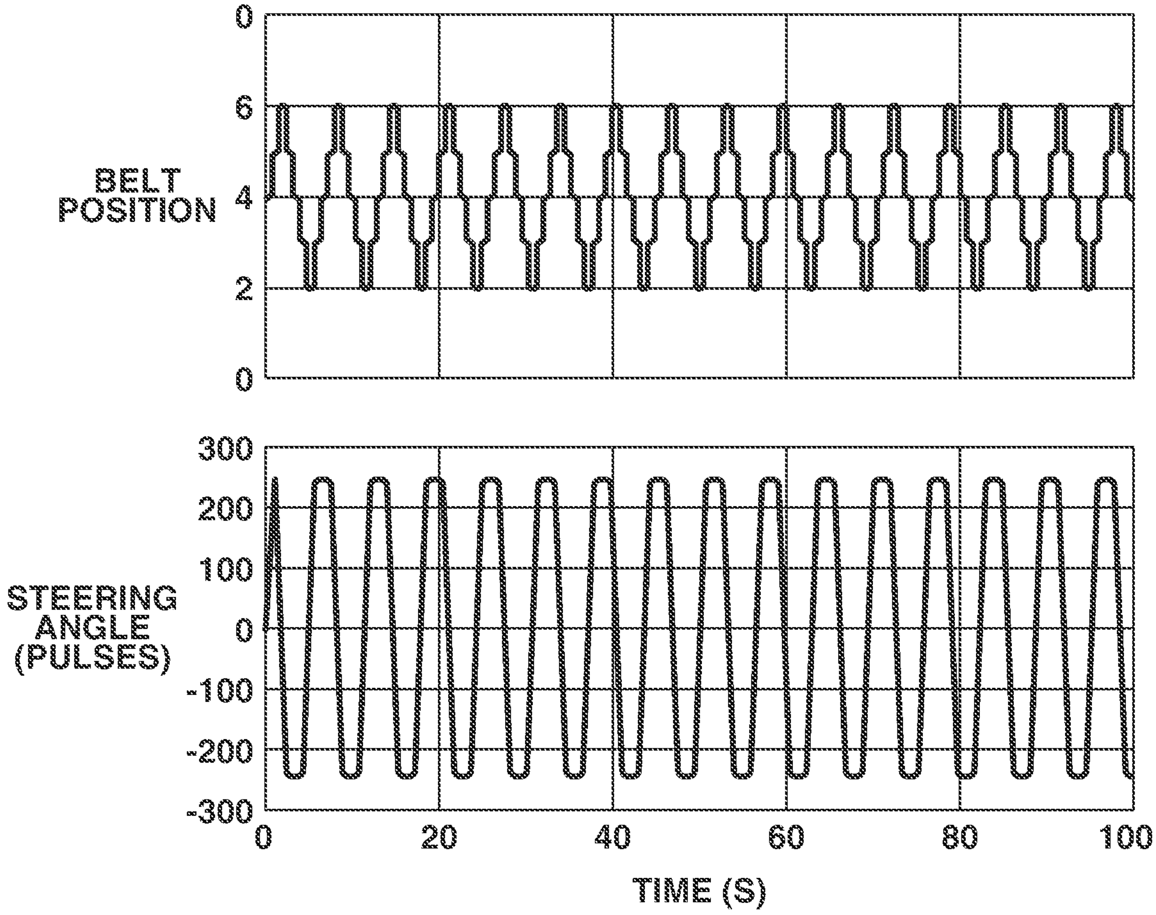
FIG. 16 is a diagram illustrating the relationship between the belt position and the tilt angle of the steering roller with the pressure rotation member in the separated state according to the modification.

As illustrated in FIG. 16, by performing the foregoing steering control, the fixing belt 310 can be reciprocated within a narrower range than when the steering control is performed at the "near 3" and "far 3" positions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A fixing apparatus comprising:

a fixing belt that is rotatable and endless, wherein the fixing belt has a width and is configured to be moved in a direction of the width of the fixing belt that includes a first width direction and a second width direction;

a heating roller configured to contact an inner peripheral surface of the fixing belt and apply heat to the fixing belt;

a steering roller configured to contact the inner peripheral surface of the fixing belt along with the heating roller;

a pressure rotation member configured to press the fixing belt, wherein the pressure rotation member and the fixing belt are configured to contact in a contact state to form a nip portion and, to fix an unfixed toner image to a recording material, the recording material bearing the unfixed toner image is conveyed to the nip portion and sandwiched between the pressure rotation member and the fixing belt;

a contact-separation mechanism having structure configured to move the pressure rotation member to a position where the pressure rotation member is in the contact state with the fixing belt and to a position where the pressure rotation member is in a separated state from the fixing belt;

a belt position detection unit configured to detect a position of the fixing belt in the width direction of the fixing belt; and a control unit configured to move the fixing belt in the first width direction and in the second width direction by controlling swing of the steering roller based on a detection result of the belt position detection unit, wherein the steering roller is at a first angle when the fixing belt is at a predetermined position during a belt moving period while the fixing belt is moved in one of the first and second width directions of the fixing belt in the contact state, and wherein the steering roller is at a second angle which is smaller than the first angle when the fixing belt is at the predetermined position during the belt moving period while the fixing belt is moved in the one of the first and second width directions of the fixing belt in the separated state.

2. The fixing apparatus according to claim 1, wherein in a predetermined job, a rotation speed of the fixing belt when the pressure rotation member is in the separated state is the same as that of the fixing belt when the pressure rotation member is in the contact state.

3. The fixing apparatus according to claim 1, wherein an amount of change in a tilt angle of the steering roller by a single tilt operation to rotate the steering roller based on the detection result of the belt position detection unit is smaller in the separated state than the amount of change in the tilt angle of the steering roller in the contact state.

4. The fixing apparatus according to claim 1, the fixing apparatus further comprising a pad configured to abut on the inner peripheral surface of the fixing belt to form the nip portion with the pressure rotation member via the fixing belt.

5. The fixing apparatus according to claim 1, the fixing apparatus further comprising a drive motor configured to drive the heating roller to rotate.

6. The fixing apparatus according to claim 1, wherein the steering roller is disposed downstream from the heating roller in a rotation direction of the fixing belt.

7. The fixing apparatus according to claim 6, wherein the belt position detection unit is disposed between the steering roller and the heating roller in the rotation direction of the fixing belt.

8. The fixing apparatus according to claim 6, wherein, in a case where a center position distance is a distance between (i) a center position of the fixing belt in performing an operation to tilt the steering roller for a first time after the center position of the fixing belt is separated from a center position of a range of movement of the fixing belt and (ii) the center position of the range of movement of the fixing belt in the width direction, the center position distance is smaller in the separated state than in the contact state.

* * * * *